(12) United States Patent
Meylan et al.

(10) Patent No.: US 11,502,964 B2
(45) Date of Patent: Nov. 15, 2022

(54) SYSTEMS AND METHODS FOR WIRELESS COMMUNICATION

(71) Applicant: QUALCOMM Incorporated, San Diego, CA (US)

(72) Inventors: Arnaud Meylan, San Diego, CA (US); Xinchen Zhang, San Diego, CA (US); Ralph Akram Gholmieh, San Diego, CA (US); Gang Xiao, San Diego, CA (US); Rudhir Varna Upretee, San Diego, CA (US); Vinay Rajkumar Patil, San Diego, CA (US); Shailesh Maheshwari, San Diego, CA (US); Jason Tan, San Diego, CA (US); Arun Prasanth Balasubramanian, San Diego, CA (US); Pulkit Hanswal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 16/670,569

(22) Filed: Oct. 31, 2019

(65) Prior Publication Data

US 2021/0067456 A1    Mar. 4, 2021

Related U.S. Application Data

(60) Provisional application No. 62/893,277, filed on Aug. 29, 2019.

(51) Int. Cl.
*H04L 47/30* (2022.01)
*H04L 1/00* (2006.01)
(Continued)

(52) U.S. Cl.
CPC ............ *H04L 47/30* (2013.01); *H04L 1/0026* (2013.01); *H04L 43/50* (2013.01); *H04L 47/34* (2013.01);
(Continued)

(58) Field of Classification Search
None
See application file for complete search history.

(56) References Cited

U.S. PATENT DOCUMENTS 10,433,222 B1    10/2019   Marupaduga et al.
2009/0104919 A1   4/2009   Heater et al.
(Continued)

OTHER PUBLICATIONS

International Search Report and Written Opinion—PCT/US2020/046903—ISA/EPO—dated Nov. 4, 2020.

*Primary Examiner* — Yemane Mesfin
*Assistant Examiner* — Jeff Banthrongsack
(74) *Attorney, Agent, or Firm* — Yanling Yang

(57) ABSTRACT

Various aspects of the present disclosure generally relate to wireless communication. In some aspects, a method may include simulating a degradation of at least one of a first wireless communication link with a network or a different second wireless communication link with the network based on detecting that a first set of one or more packets, which were received via the first wireless communication link with the network and were added to a packet buffer, and a second set of one or more packets, which were received via the different second wireless communication link with the network and were added to the packet buffer, satisfy a threshold occupancy of the packet buffer. Numerous other aspects are provided.

19 Claims, 18 Drawing Sheets

(51) Int. Cl.
   *H04W 28/14* (2009.01)
   *H04W 8/04* (2009.01)
   *H04L 47/34* (2022.01)
   *H04W 28/04* (2009.01)
   *H04W 28/12* (2009.01)
   *H04L 43/50* (2022.01)
(52) U.S. Cl.
   CPC ............ *H04W 8/04* (2013.01); *H04W 28/04* (2013.01); *H04W 28/12* (2013.01); *H04W 28/14* (2013.01)

(56) References Cited

U.S. PATENT DOCUMENTS

| | | |
|---|---|---|
| 2010/0309788 A1 | 12/2010 | Ho et al. |
| 2011/0255512 A1 | 10/2011 | Lee et al. |
| 2012/0039176 A1* | 2/2012 | Eshan ............... H04W 28/0268 370/237 |
| 2013/0329583 A1 | 12/2013 | Vrzic et al. |
| 2014/0036808 A1 | 2/2014 | Pelletier et al. |
| 2014/0185480 A1 | 7/2014 | Lee et al. |
| 2015/0117357 A1 | 4/2015 | Ozturk et al. |
| 2017/0118793 A1* | 4/2017 | Liu ....................... H04W 76/28 |
| 2017/0325124 A1 | 11/2017 | Mitra et al. |
| 2017/0353950 A1 | 12/2017 | Song et al. |
| 2018/0324642 A1 | 11/2018 | Yu et al. |
| 2020/0382846 A1 | 12/2020 | Zhou |
| 2021/0185747 A1 | 6/2021 | Kanamarlapudi |

\* cited by examiner

SYSTEMS AND METHODS FOR WIRELESS COMMUNICATION

CROSS-REFERENCE TO RELATED APPLICATIONS

This application claims priority to, and the benefit of, U.S. provisional patent application Ser. No. 62/893,277, filed Aug. 29, 2019 and entitled "SYSTEMS AND METHODS FOR WIRELESS COMMUNICATION", which is hereby incorporated by reference herein in its entirety.

BACKGROUND

The present disclosure relates generally to communication systems, and more particularly, to wireless communication by a user equipment.

Wireless communications systems are widely deployed to provide various types of communication content such as voice, video, packet data, messaging, broadcast, and so on. These systems may be capable of supporting communication with multiple users by sharing the available system resources, e.g., time, frequency, and power. Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system or a New Radio (NR) system. A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in LTE technology and/or 5G NR technology. These improvements may also be applicable to other multi-access technologies and the telecommunication standards that employ these technologies.

SUMMARY

One aspect is a method for receiving a plurality of packets having a defined order via wireless communication. The method may comprise, by one or more processors of a user equipment, receiving a first set of one or more packets of the plurality of packets having the defined order via a first wireless communication link with a network; receiving a second set of one or more packets of the plurality of packets having the defined order via a different second wireless communication link with the network; adding the first set of one or more packets of the plurality of packets having the defined order, which were received via the first wireless communication link with the network, to a packet buffer; adding the second set of one or more packets of the plurality of packets having the defined order, which were received via the different second wireless communication link with the network, to the packet buffer; detecting that the second set of one or more packets, which were received via the different second wireless communication link with the network and were added to the packet buffer, satisfy a threshold occupancy of the packet buffer; and simulating a degradation of the different second wireless communication link based on detecting that the second set of one or more packets, which were received via the different second wireless communication link with the network and were added to the packet buffer, satisfy the threshold occupancy of the packet buffer.

Another aspect is a method for receiving a plurality of packets having a defined order via wireless communication. The method may comprise, by one or more processors of a user equipment, receiving a first set of one or more packets of the plurality of packets having the defined order via a first wireless communication link with a network; receiving a second set of one or more packets of the plurality of packets having the defined order via a different second wireless communication link with the network; adding the first set of one or more packets of the plurality of packets having the defined order, which were received via the first wireless communication link with the network, to a packet buffer; adding the second set of one or more packets of the plurality of packets having the defined order, which were received via the different second wireless communication link with the network, to the packet buffer; detecting that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer; and simulating a degradation of at least one of the first wireless communication link or the different second wireless communication link based on detecting that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer.

Yet another aspect is a method for receiving a plurality of packets having a defined order via wireless communication. The method may comprise, by one or more processors of a user equipment, receiving a first set of one or more packets of the plurality of packets having the defined order via a first wireless communication link with a network; receiving a second set of one or more packets of the plurality of packets having the defined order via a different second wireless communication link with the network; adding the first set of one or more packets of the plurality of packets having the defined order, which were received via the first wireless communication link with the network, to a packet buffer; adding the second set of one or more packets of the plurality of packets having the defined order, which were received via the different second wireless communication link with the network, to the packet buffer; identifying a first sequence number of a packet of the first set of one or more packets, which were received via the first wireless communication link with the network and were added to the packet buffer; identifying a second sequence number of a second packet of the second set of one or more packets, which were received via the different second wireless communication link with the network and were added to the packet buffer; detecting that a difference between the identified first sequence number of the first packet and the identified second sequence number of the second packet satisfies a threshold sequence number difference; and simulating a degradation of the different second wireless communication link based on detecting that a difference between the identified first sequence number of the first packet and the identified second sequence number of the second packet satisfies a threshold sequence number difference.

Further embodiments include an apparatus (e.g., a user equipment or any other apparatus) that may comprise one or more processors configured with processor-executable instructions to perform operations of the methods and aspects summarized above, one or more other aspects described below, or any combination thereof. Further embodiments include an apparatus (e.g., a user equipment or any other apparatus) that may comprise means for performing functions of the methods and aspects summarized above, one or more other aspects described below, or any combination thereof. Further embodiments include a non-transitory processor-readable storage medium having stored thereon processor-executable instructions configured to cause one or more processors (e.g., one or more processors of a user equipment or one or more other processors) to perform operations of the methods and aspects summarized above, one or more other aspects described below, or any combination thereof. Further embodiments include a method that may include operations of the methods and aspects summarized above, one or more other aspects described below, or any combination thereof.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION

Figure 1:
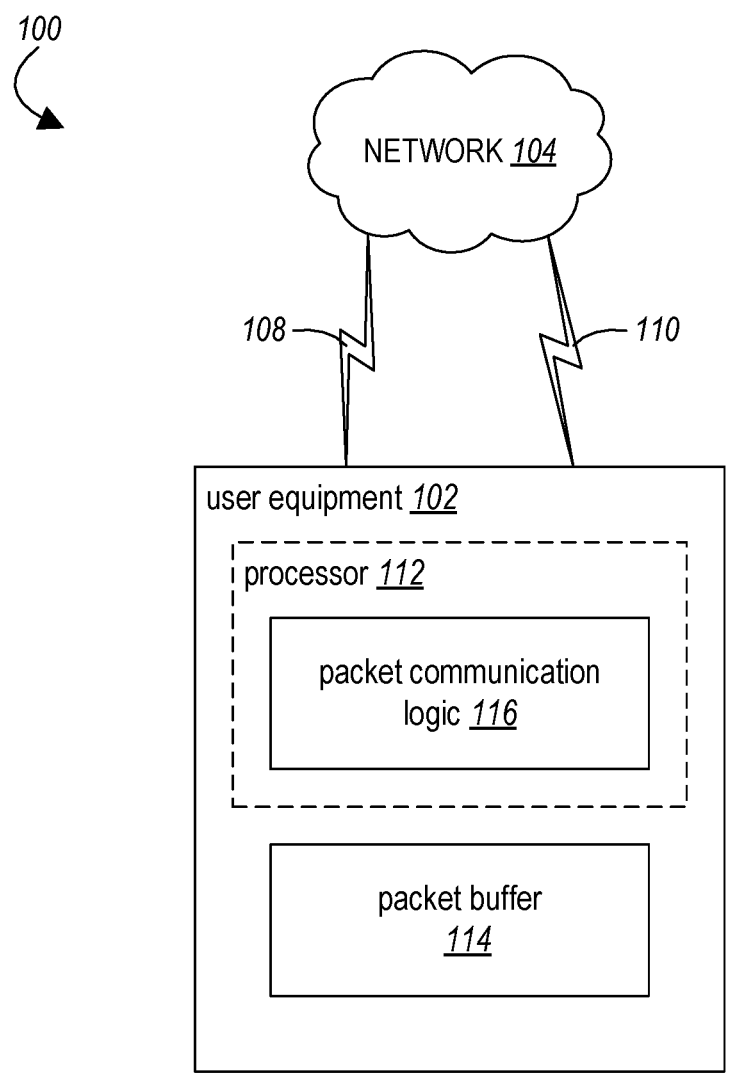
FIG. 1 is a diagram of a communication system according to some embodiments.

As shown in FIG. 1, a communication system 100 may include one or more user equipment (UE) 102. The user equipment 102 may communicate using one or more wireless communication systems (such as, CDMA systems, TDMA systems, OFDMA systems, LTE systems, NR systems, WiFi systems, Bluetooth systems, or any wireless communication systems), one or more wired communication systems, or any combination thereof.

The communication system 100 may include one or more networks, such as a network 104. The network 104 may form at least part of a wireless communication system. The network 104 may support a set of one or more wireless radio access technologies (RATs) (e.g., support CDMA, TDMA, OFDMA, LTE, NR, and/or WiFi standards).

The user equipment 102 may be configured to use a first wireless communication link 108 to communicate with the network 104 and use a different, second wireless communication link 110 to communicate with the network 104. The user equipment 102 may receive voice services, data services or both using the first wireless communication link 108 with the network 104. The user equipment 102 may receive voice services, data services or both using the second wireless communication link 110 with the network 104.

Figure 14:
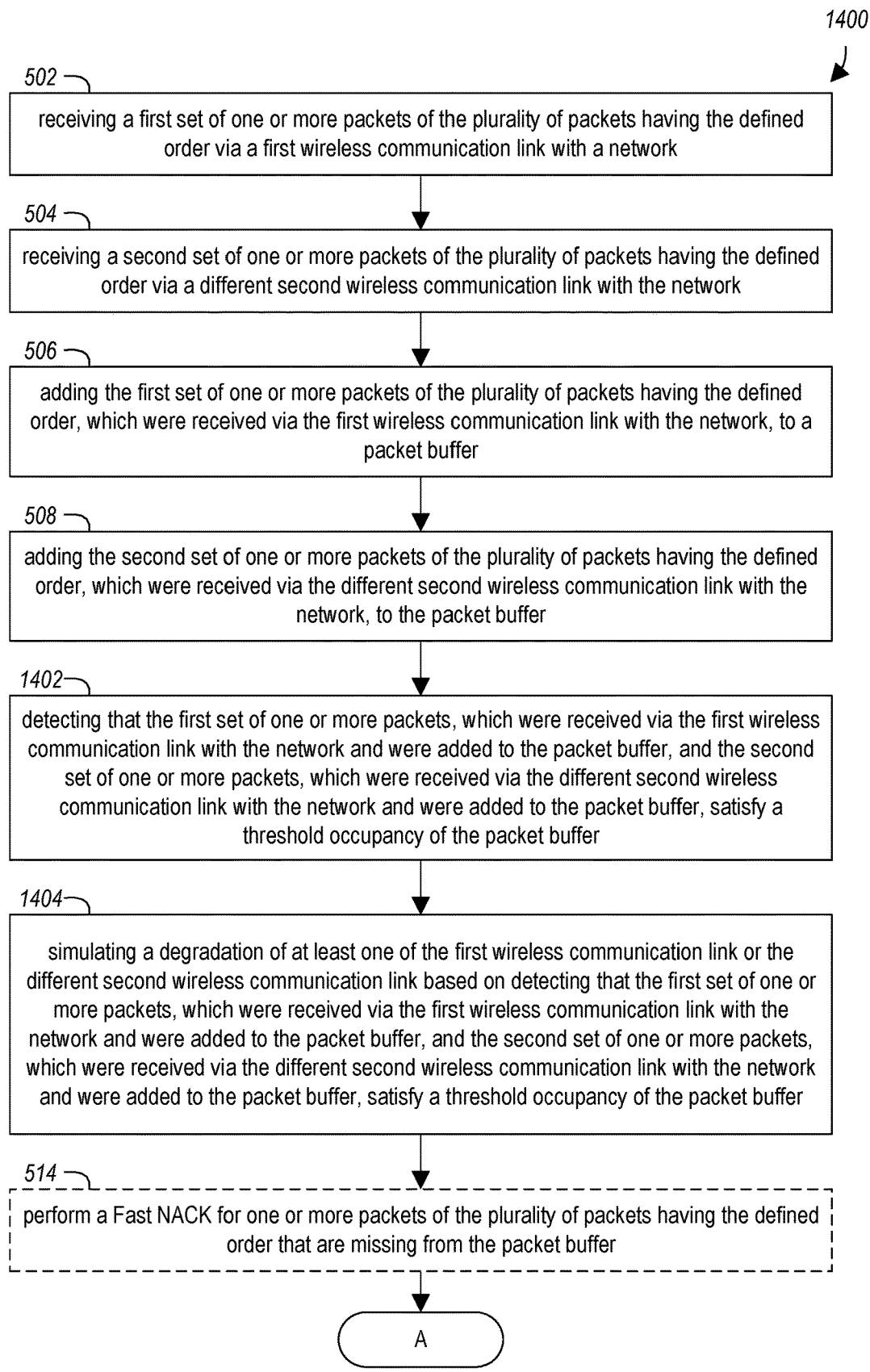
FIG. 14 is a flowchart illustrating a method for wireless communication according to some embodiments.

The user equipment 102 may include a processor (e.g., a processor 112, a processor 1402 in FIG. 14, a modem processor 1408 in FIG. 14, or other suitable processor).

The user equipment 102 may be configured to communicate with the network 104 using one or more layers or protocols, such as, packet data convergence protocol (PDCP) or any other suitable layer or protocol. For example, the network 104 may transmit one or more packets—such as, PDCP protocol data units (PDUs) or any other suitable packets—which the user equipment 102 may receive from the network 104. For instance, the user equipment 102 may be configured to use PDCP to receive one or more packets from the network 104 via the first wireless communication link 108 and use PDCP to receive one or more packets from the network 104 via the second wireless communication link 110.

The one or more packets—which the user equipment 102 may receive from the network 104—may have a defined order. In some embodiments, each packet of the one or more packets may include an indication of the packet's position in the defined order, such as, a sequence number or other indication of the packet's position in the defined order. For instance, one or more schedulers or other components of the network 104 may assign a PDCP sequence number to a PDCP PDU, and the PDCP PDU may be configured to include the PDCP sequence number or other indication of the PDCP sequence number.

In some instances, the user equipment 102 may receive the packets in an order other than the defined order. For example, the network 104 may transmit the packets in the defined order, but one or more of the packets may be lost and the network 104 may retransmit the one or more packets, which the user equipment 102 receives in an order other than the defined order. Also, for example, various components of the network 104 may transmit the packets at various times and in various orders, despite the packets' defined order.

As shown in FIG. 1, the user equipment 102 may include a packet buffer 114 to which the user equipment 102 may add the packets it receives from the network 104. Later, the user equipment 102 may remove one or more packets from the packet buffer 114 and may, for example, pass the removed packets to one or more layers.

In some embodiments, the user equipment 102 may be configured to remove one or more packets from the packet buffer 114 based on the defined order and pass the removed packets to one or more layers based on the defined order. For example, as noted above, the packets may include a sequence number, and the user equipment 102 may be configured to remove the packet with the lowest sequence number that has not already been removed from the packet buffer 114.

Figure 2A:
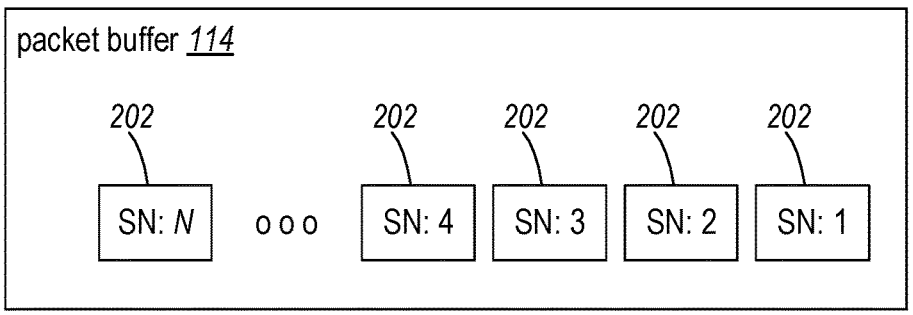
FIGS. 2A to 2D are diagrams illustrating an exemplary packet buffer according to some embodiments.
Figure 2B:
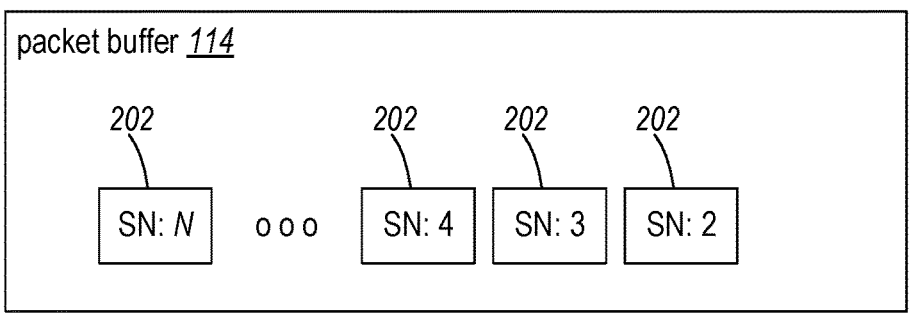
Figure 2C:
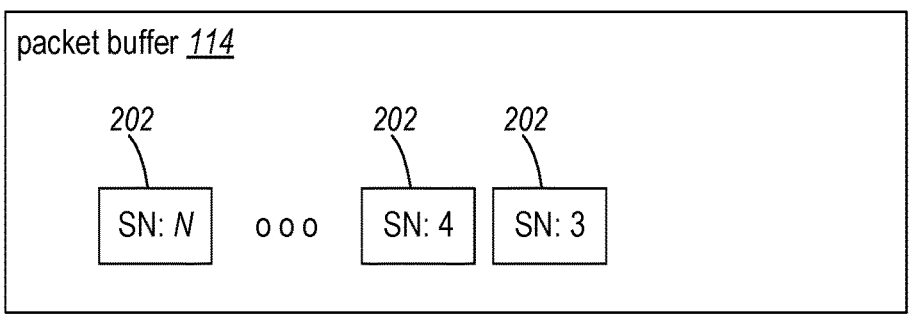
Figure 2D:
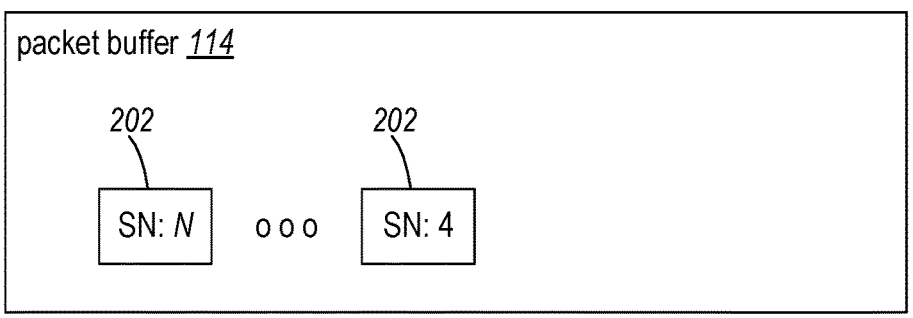

For instance, as shown in FIG. 2A, where a group of packets 202 have sequence numbers ranging from 1 to N, the user equipment 102 may be configured to remove the packet 202 with the sequence number of 1 (FIG. 2B), then the packet 202 with the sequence number 2 (FIG. 2C), then the packet 202 with the sequence number 3 (FIG. 2D), and so on sequentially up to the packet 202 with the sequence number of N. Also, for instance, where a group of packets 202 have sequence numbers ranging from 1 to N, the user equipment 102 may be configured to remove the packets 202 in groups, for instance, remove the packets 202 with the sequence numbers of 1 and 2, then the packets 202 with the sequence numbers 3 to 6, and so on sequentially up to the packet 202 with the sequence number of N.

Figure 3A:
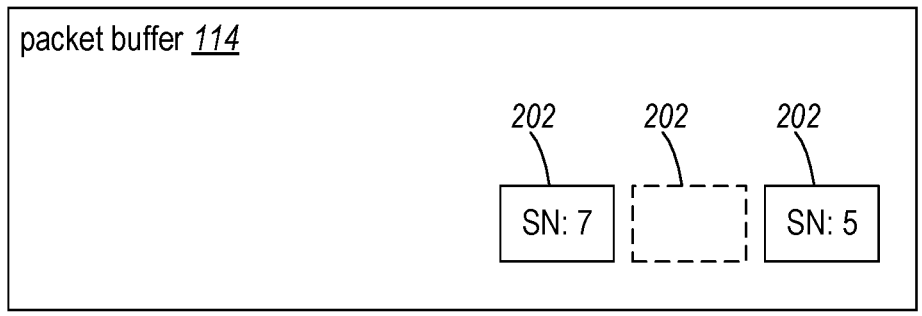
FIGS. 3A to 3C are diagrams illustrating an exemplary packet buffer according to some embodiments.
Figure 3B:
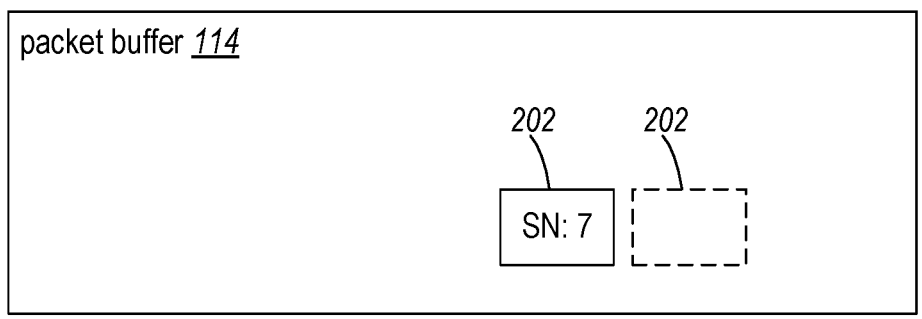
Figure 3C:
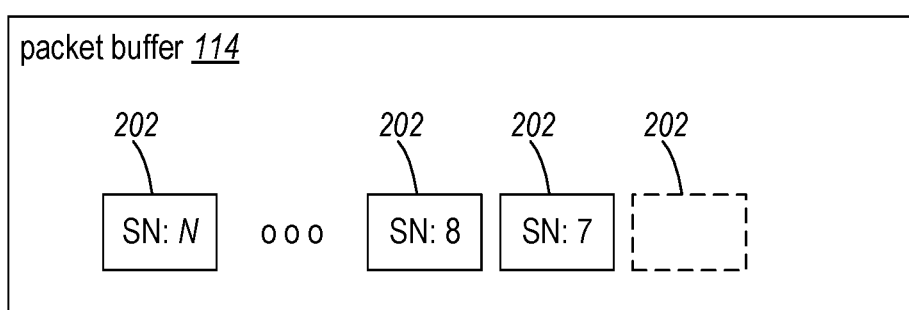

In some embodiments in which the user equipment 102 is configured to remove one or more packets 202 from the packet buffer 114 based on the defined order, the packet 202 with the lowest sequence number that has not already been removed from the packet buffer 114 may be missing from the packet buffer 114. In particular, the user equipment 102 may be waiting to receive the packet 202, such as, waiting for the initial transmission of the packet 202 or waiting for a retransmission of the packet 202. While the user equipment 102 is waiting to receive the packet 202 with the lowest sequence number that has not already been removed from the packet buffer 114, the user equipment 102 may receive other packets 202 with higher sequence numbers and may add the other packets 202 with higher sequence numbers to the packet buffer 114. For example, as shown in FIG. 3A, the user equipment 102 may have already received packets 202 with sequence numbers from 1 to 5 and 7, added them to the packet buffer 114, and later removed the packets 202 with sequence numbers 1 to 4. In this example, the user equipment 102 may then remove the packet 202 with the lowest sequence number that has not already been removed from the packet buffer 114 (i.e., sequence number 5), as shown in FIG. 3B. After this removal, the packet 202 with the lowest sequence number that has not already been removed from the packet buffer 114 (i.e., sequence number 6) is missing from the packet buffer 114. Consequently, the user equipment 102 may wait to receive the missing packet 202. While the user equipment 102 is waiting to receive the packet 202 with the lowest sequence number that has not already been removed from the packet buffer 114, the user equipment 102 may receive one or more other packets 202 with higher sequence numbers (e.g., sequence numbers 8 to AO and may add the other packets 202 with the higher sequence numbers to the packet buffer 114, as shown in FIG. 3C. It will be appreciated that, as the user equipment 102 receives the other packets 202 with higher sequence numbers and adds them to the packet buffer 114, there may be additional missing packets that form other gaps in those higher sequence numbers.

The packet buffer 114 may have a defined capacity. Thus, as shown above, while the user equipment 102 waits to receive the packet 202 with the lowest sequence number that has not already been removed from the packet buffer, the user equipment 102 may fill some or all of the packet buffer's capacity with other packets 202 with higher sequence numbers.

As some point, the user equipment 102 may stop waiting to receive the packet 202 with the lowest sequence number that has not already been removed from the packet buffer and may remove one or more other packets 202 from the packet buffer 114. For example, the user equipment 102 may flush the packet buffer 114, despite one or more packets 202 missing from the packet buffer 114.

In further detail, when the packet buffer 114 is filled to a threshold occupancy (e.g., completely filled or filled to a defined threshold amount), the user equipment 102 may flush the packet buffer 114, that is, remove some or all of the packets 202 in the packet buffer 202 and transmit the removed packets 202 to one or more layers regardless of whether there are missing packets 202 in between. (Thus, when the packet buffer 114 is filled to a buffer-flush-triggering threshold occupancy, the user equipment 102 may flush the packet buffer 102, even when the packet 202 with the lowest sequence number that has not already been removed from the packet buffer 114 is missing from the packet buffer 114.)

Flushing the packet buffer 114 when there are missing packets 202 may be undesirable because the missing packets 202 may include a large amount of data, and the loss of the data may result in reduced performance and reduced user experience for the user equipment 102. Also, flushing the packet buffer 114 when there are missing packets 202 may be undesirable because a layer the receives the flushed packets 202, e.g., a transport layer like Transport Control Protocol, may reduce the throughput in response to detecting that packets 202 are missing, and the reduced throughput may result in reduced performance and reduced user experience for the user equipment 102. Moreover, flushing the packet buffer 114 when there are missing packets 202 may be undesirable because, after the flush, the user equipment 102 may discard the missing packets if they arrive (e.g., because the protocol may require the packets to be delivered in sequence and, after the flush, the missing packets cannot be delivered in sequence). Thus, the network capacity used to transmit the missing packets 202, which were later discarded, will have been wasted.

An alternative to flushing the packet buffer 114 may be to discard new packets 202 before placing them in the packet buffer 114. Depending on the number of gaps in the packet buffer 114, data rates, latency and/or other factors, discarding the new packets 202 without buffering may be more than flushing or less desirable than flushing. Unfortunately, while flushing the packet buffer 114 may be undesirable when there are missing packets 202, refraining from flushing the packet buffer 114 may be even less desirable. In particular, in some situations, flushing the packet buffer 114 may provide necessary room for additional packets 202 sent by the network 104, and refraining from flushing the packet buffer 114 would undesirably result in the additional packets 202 being dropped.

The user equipment 102 may be configured to use dual connectivity to receive packets 202, e.g., dual cell connectivity, via the first wireless communication link 108 and the second wireless communication link 110.

In some embodiments, the user equipment 102 may be configured to use dual connectivity, e.g., dual cell connectivity, to receive packets 202 via a plurality of radio access technologies. For example, using E-UTRAN New Radio-Dual Connectivity (EN-DC), the network 104 may use the first wireless communication link 108 to send packets 202 via a first radio access technology, such as LTE, and may use the second wireless communication link 110 to send packets 202 via a different, second radio access technology, such as NR, and the user equipment 102 may receive the packets 202 via the first radio access technology using the first wireless communication link 108 and via the second radio access technology using the second wireless communication link 110.

In some embodiments, the user equipment 102 may be configured to use dual connectivity, e.g., dual cell connectivity, to receive packets 202 via a single radio access technology (e.g., LTE only or NR only). For example, the network 104 may use the first wireless communication link 108 to send packets 202 via a first radio access technology (e.g., NR or LTE) and may use the second wireless communication link 110 to send packets 202 via the same first radio access technology.

In some embodiments, the user equipment 102 may be configured to use carrier aggregation to receive packets 202 via the first wireless communication link 108 and the second wireless communication link 110. For example, the network 104 may carrier aggregate the first wireless communication link 108 (e.g., NR sub6) and the second wireless communication link 110 (e.g., NR mmW) to send packets 202.

The packets 202 sent and received via the first wireless communication link 108 (e.g., via the first radio access technology, a first cell, a first numerology, or any combination thereof) and the packets 202 sent and received via the second wireless communication link 110 (e.g., via the second radio access technology, a different second cell, a different second numerology, or any combination thereof) may collectively share a defined order. For example, in some embodiments in which the network 104 sends packets 202 via the first wireless communication link 108 and via the second wireless communication link 110, the network 104 may share a PDCP among both the packets 202 sent via the first wireless communication link 108 and the packets 202 sent via the second wireless communication link 110. When the network 104 shares a PDCP among both the packets 202 sent via the first wireless communication link 108 and the packets 202 sent via the second wireless communication link 110, the packets 202 sent via the first wireless communication link 108 and the packets 202 sent via the second wireless communication link 110 may collectively share a defined order, which may be indicated by the packets' PDCP sequence numbers. Thus, as one example in which a group of packets have sequence numbers of 1 to 67, the network 104 may send packets 202 having sequence numbers 1 to 5, 14 to 27, and 50 to 67 via the first wireless communication link 108 and may send packets 202 having sequence numbers 6 to 13 and 28 to 49 via the second wireless communication link 110.

In some embodiments in which the packets 202 sent and received via the first wireless communication link 108 and the packets 202 sent and received via the second wireless communication link 110 collectively share a defined order, the user equipment 102 may have a packet buffer 114 for receiving both the packets 202 sent via the first wireless communication link 108 and the packets 202 sent via the second wireless communication link 110. Thus, in such embodiments, the user equipment 202 may add both packets 202 received via the first wireless communication link 108 (e.g., via the first radio access technology, the first cell, the first numerology, or any combination thereof) and packets 202 received via the second wireless communication link 110 (e.g., via the second radio access technology, the different second cell, the different second numerology, or any combination thereof) to the packet buffer 114; and the user equipment 102 may remove one or more packets 202 from the packet buffer 114 based on the shared defined order and pass the removed packets to one or more layers based on the shared defined order.

Figure 4A:
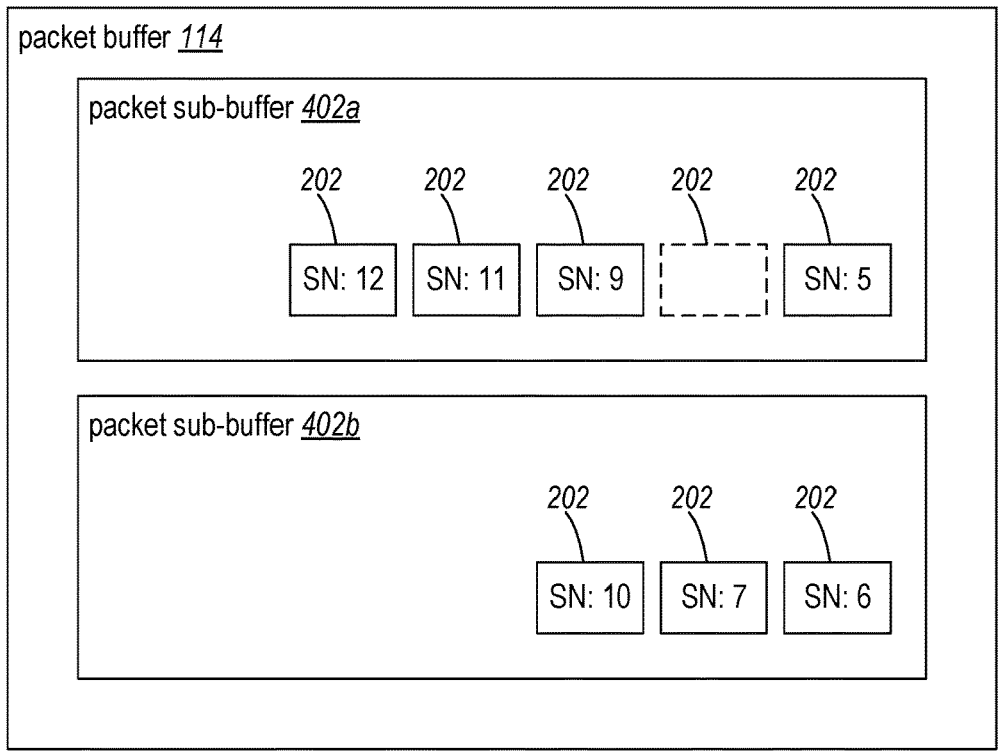
FIGS. 4A to 4E are diagrams illustrating an exemplary packet buffer according to some embodiments.
Figure 4B:
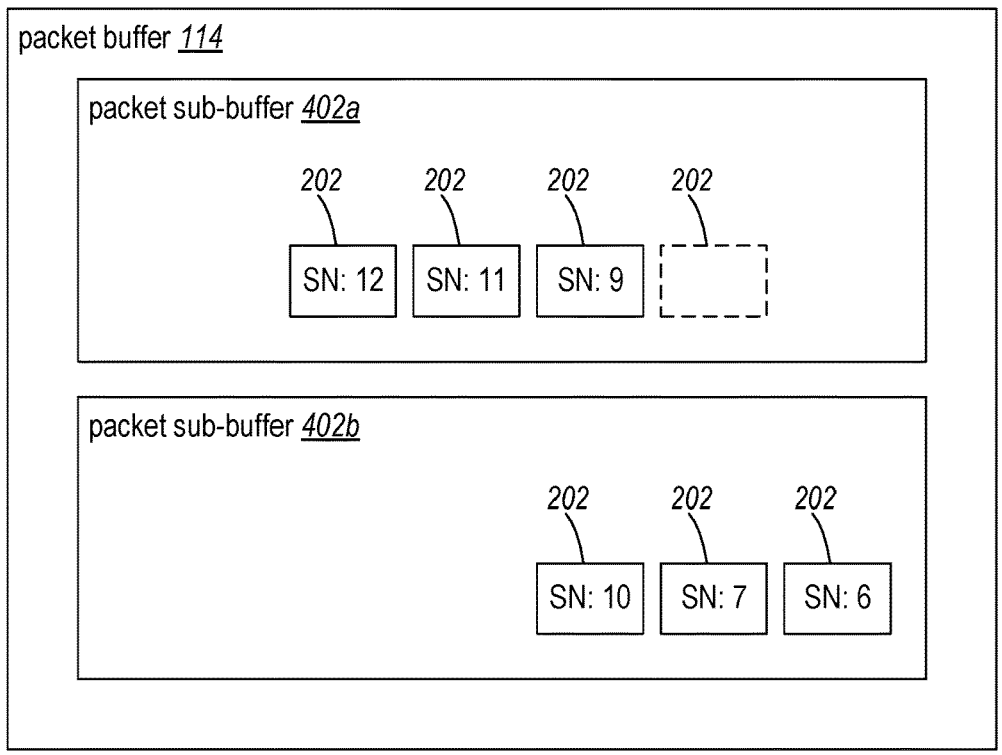
Figure 4C:
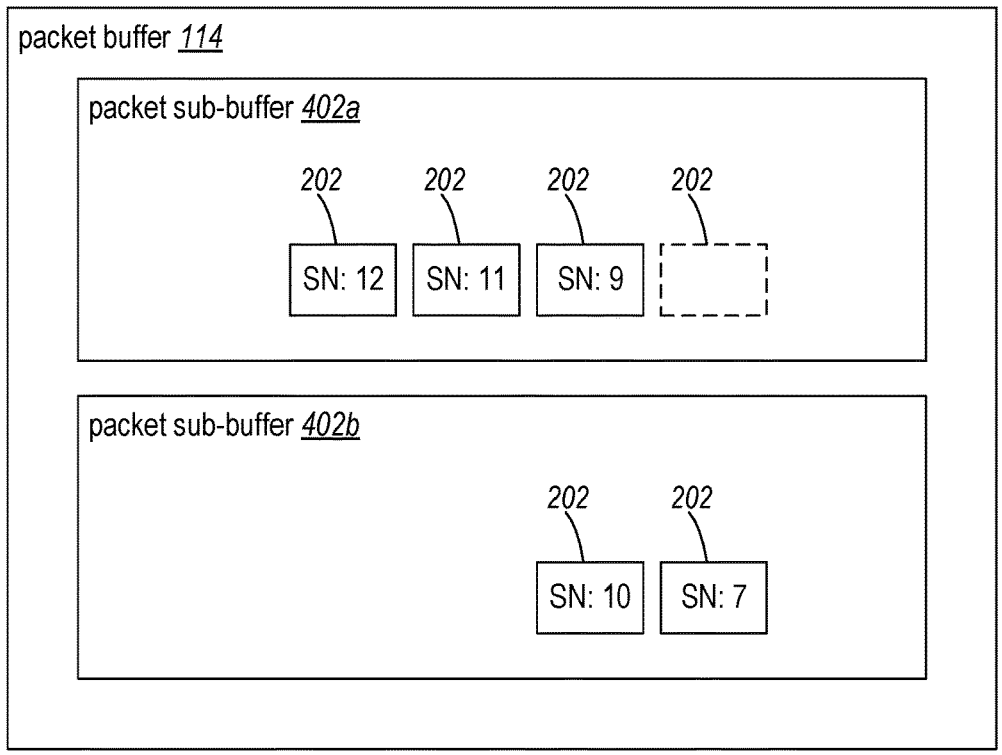
Figure 4D:
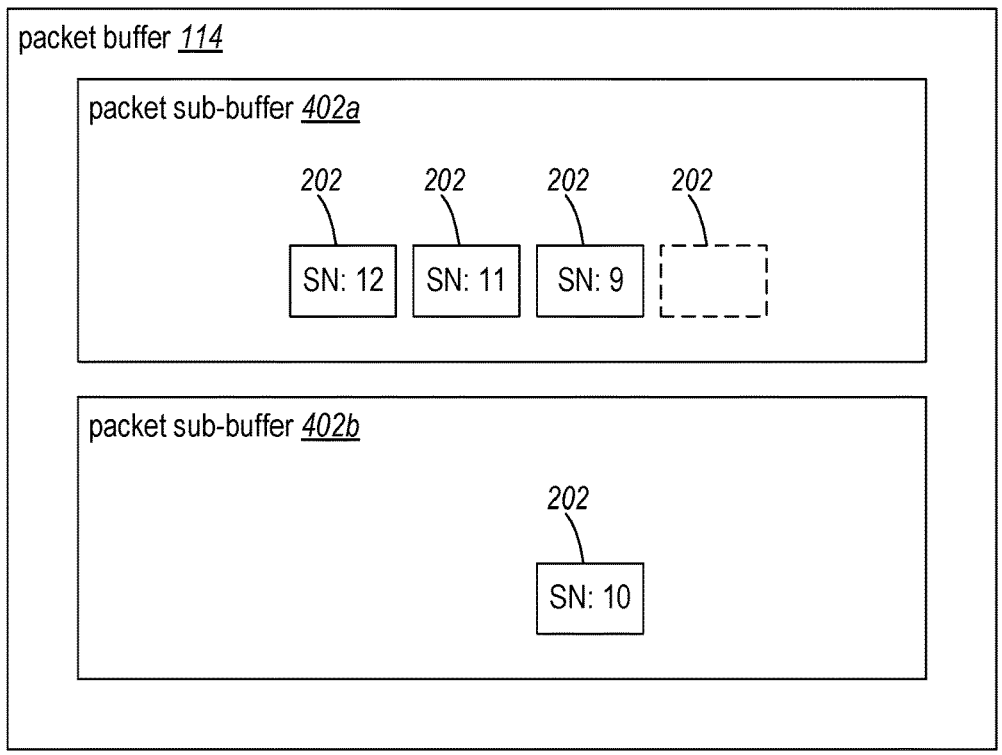

In some embodiments, the packet buffer 114 may be logically and/or physically separated and may comprise a first packet sub-buffer allocated to the first wireless communication link 108 (e.g., allocated to the first radio access technology, the first cell, the first numerology, or any combination thereof) and a second packet sub-buffer allocated to the second wireless communication link 110 (e.g., allocated to the second radio access technology, the different second cell, the different second numerology, or any combination thereof). In particular, as shown in FIG. 4A, the packet buffer 114 may comprise a first packet sub-buffer 402a and a second packet sub-buffer 402b, and the user equipment 102 may add packets 202 received via the first wireless communication link 108 to the first packet sub-buffer 402a and may add packets 202 received via the second wireless communication link 110 to the second packet sub-buffer 402b. For example, as shown in FIG. 4A, the user equipment 102 may have received packets 202 with sequence numbers 1 to 5, 9, 11 and 12 via the first wireless communication link 108 and added them to the first packet sub-buffer 402a; received packets with sequence numbers 6, 7 and 10 via the second wireless communication link 110 and added them to the second packet sub-buffer 402b; and later removed the packets 202 with sequence numbers 1 to 4 from the first packet sub-buffer 402a and the packet buffer 114. In this example, the user equipment 102 may then remove the packet 202 with the lowest sequence number that has not already been removed from the packet buffer 114. As shown in FIG. 4A, the packet 202 with the lowest sequence number that has not already been removed from the packet buffer 114 (i.e., sequence number 5) is in the first packet sub-buffer 402a, and thus, the user equipment 102 may remove the packet 202 with the sequence number 5 from the first packet sub-buffer 402a and the packet buffer 114, as shown in FIG. 4B. After this removal, the packet 202 with the lowest sequence number that has not already been removed from the packet buffer 114 (i.e., sequence number 6) is in the second packet sub-buffer 402b, and thus, the user equipment 102 may remove the packet 202 with the sequence number 6 from the second packet sub-buffer 402b and the packet buffer 114, as shown in FIG. 4C. The user equipment 102 continue to remove the packets 202 from their respective packet sub-buffer 402 of the packet buffer 114 based on the packets' defined order, e.g., based on each packet's sequence number. The user equipment 102 may be configured to remove the packets 202 from their respective packet sub-buffers 402 of the packet buffer 114 individually, in groups, or both, for example, as discussed above. As shown in FIG. 4C, the packet 202 with the lowest sequence number that has not already been removed from the packet buffer 114 (i.e., sequence number 7) is in the second packet sub-buffer 402b, and thus, the user equipment 102 may remove the packet 202 with the sequence number 7 from the second packet sub-buffer 402b and the packet buffer 114, as shown in FIG. 4D. As shown in FIG. 4D, the packet 202 with the lowest sequence number that has not already been removed from the packet buffer 114 (i.e., sequence number 8) is missing from the packet buffer 114. Consequently, the user equipment 102 may wait to receive the missing packet 202 with the sequence number 8. In the meantime, the network 104 may send more packets 202.

The first packet sub-buffer allocated to the first wireless communication link 108 may have a first defined capacity and the second packet sub-buffer allocated to the second wireless communication link 110 may have a second defined capacity. For example, the packet buffer 114 may have a defined capacity, the first packet sub-buffer 402a may have a capacity that is a first defined percentage of the packet buffer's capacity, and the second packet sub-buffer 402b may have a capacity that is a second defined percentage of the packet buffer's capacity. In some instances, the sum of the first defined percentage of the packet buffer's capacity and the second defined percentage of the packet buffer's capacity may be one hundred percent, that is, the capacity of the first packet sub-buffer 402a and the capacity of the second packet sub-buffer 402b comprise the total capacity of the packet buffer. In other instances, the sum of the first defined percentage of the packet buffer's capacity and the second defined percentage of the packet buffer's capacity may be less than one hundred percent, that is, the packet buffer 114 may have other capacity that may be allocated for other purposes.

In some embodiments in which the packets 202 sent and received via the first wireless communication link 108 and the packets 202 sent and received via the second wireless communication link 110 collectively share a defined order, one wireless communication link may be significantly "ahead" of the other wireless communication link. In general, "ahead" means that one wireless communication link is delivering packets 202 with sequence numbers that are greater than the sequence numbers of the packets 202 delivered by the other wireless communication link, which may occur (for example) where there is variable latency in the network 104 between a first cell group and a second cell group, imperfect scheduling, or variations in delivery time for queued packet traffic. For instance, the highest sequence number of a packet 202 transmitted by the network 104 using the first wireless communication link 108 may be significantly higher than the highest sequence number of a packet 202 transmitted by the network 104 using the second wireless communication link 110. Likewise, the highest sequence number of a packet 202 received by the user equipment 102 using the first wireless communication link 108 may be significantly higher than the highest sequence number of a packet 202 received by the user equipment 102 using the second wireless communication link 110. Similarly, the highest sequence number of a packet 202 in the packet buffer 114 that was received by the user equipment 102 using the first wireless communication link 108 may be significantly higher than the highest sequence number of a packet 202 in the packet buffer 114 that was received by the user equipment 102 using the second wireless communication link 110.

One wireless communication link may become significantly ahead of the other wireless communication link for any of a variety of reasons. In general, the "ahead" wireless communication link may often become significantly ahead of the "behind" wireless communication link in situations in which the user equipment 102 is waiting to receive, via the "behind" wireless communication link, the packet 202 with the lowest sequence number that has not already been removed from the packet buffer 114.

Figure 4E:
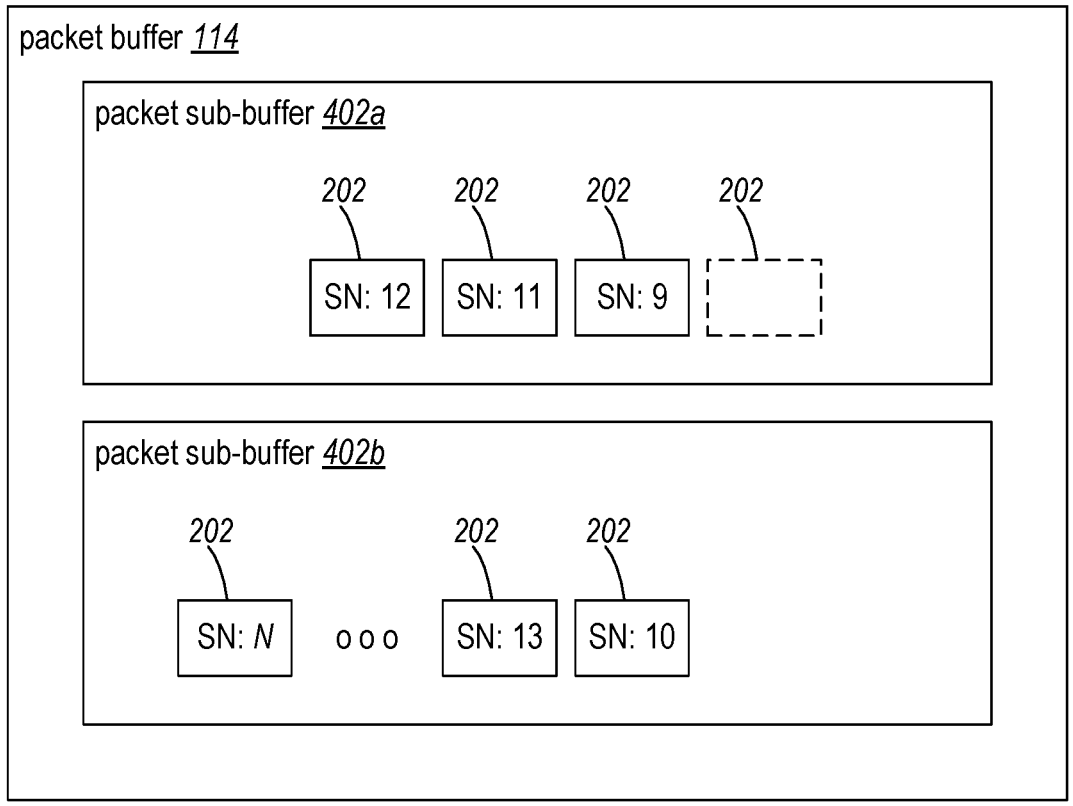

In further detail, as shown in FIG. 4D, the user equipment 102 may be waiting for to receive, via the first wireless communication link 108, the packet 202 with the lowest sequence number (i.e., sequence number 8) that is missing from the packet buffer 114 and has not already been removed from the packet buffer 114. Concurrently, as shown in FIG. 4E, the user equipment 102 may continue to receive, via the second wireless communication link 110, a significant amount of packets 202—e.g., packets 202 having sequence numbers 13 to N, where N is significantly higher than 12 (i.e., the highest sequence number of a packet 202 in the packet buffer 114 that was received using the first wireless communication link 108).

For example, the user equipment 102 might continue to receive, via the second wireless communication link 110, a significant amount of packets 202 in instances in which a first access point of the network 104 provides the first wireless communication link 108 and a second access point of the network 104 provides the second wireless communication link 110. In particular, the first and second access points may not be co-located, and, with the first and second access point not being co-located, the second access point may be unaware that the user equipment 102 is waiting to receive the missing packet 202 from the first access point. Consequently, the second access point may continue to send, via the second wireless communication link 110, a significant amount of packets 202. It will be appreciated, however, that the first and second access points may be co-located and still have one wireless communication link significantly ahead of the other wireless communication link. It will also be appreciated that the user equipment 102 may have both the first wireless communication link 108 and the second wireless communication link 110 with a single access point and still have one wireless communication link significantly ahead of the other wireless communication link.

Also, as an example, the user equipment 102 might continue to receive, via the second wireless communication link 110, a significant amount of packets 202 in instances in which the user equipment 102 comprises a multi-SIM user equipment. In particular, with a multi-SIM user equipment 102, the first wireless communication link 108 could be in a tuneaway while the second wireless communication link 110 is not in a tuneaway. Consequently, while the first wireless communication link 108 is in a tuneaway and the user equipment is waiting to receive a missing packet via the first wireless communication link 108, the user equipment 102 might continue to receive, via the second wireless communication link 110, a significant amount of packets 202.

When one wireless communication link becomes significantly ahead of the other wireless communication link, the user equipment 102 may flush the packet buffer 114 and/or one or more of the packet sub-buffers 402. For example, when one wireless communication link becomes significantly ahead of the other wireless communication link, the packet buffer 114 may be filled to a threshold occupancy, and the user equipment 102 may flush the packet buffer 114 based on the packet buffer 114 being filled to the threshold occupancy. Also, for example, when one wireless communication link becomes significantly ahead of the other wireless communication link, the packet sub-buffer 402 allocated to the "ahead" wireless communication link may be filled to a threshold occupancy, and the user equipment 102 may flush the ahead packet sub-buffer 402 based on the ahead packet sub-buffer 402 being filled to the threshold occupancy. As noted above, flushing the packet buffer 114 when there are missing packets 202 may be undesirable. Similarly, flushing a packet sub-buffer 402 when there are missing packets 202 may be undesirable for the same reasons. Various aspects discussed below may help postpone and possibly avoid flushing a packet buffer when there are missing packets and thus avoid the associated undesirable consequences.

Figure 5:
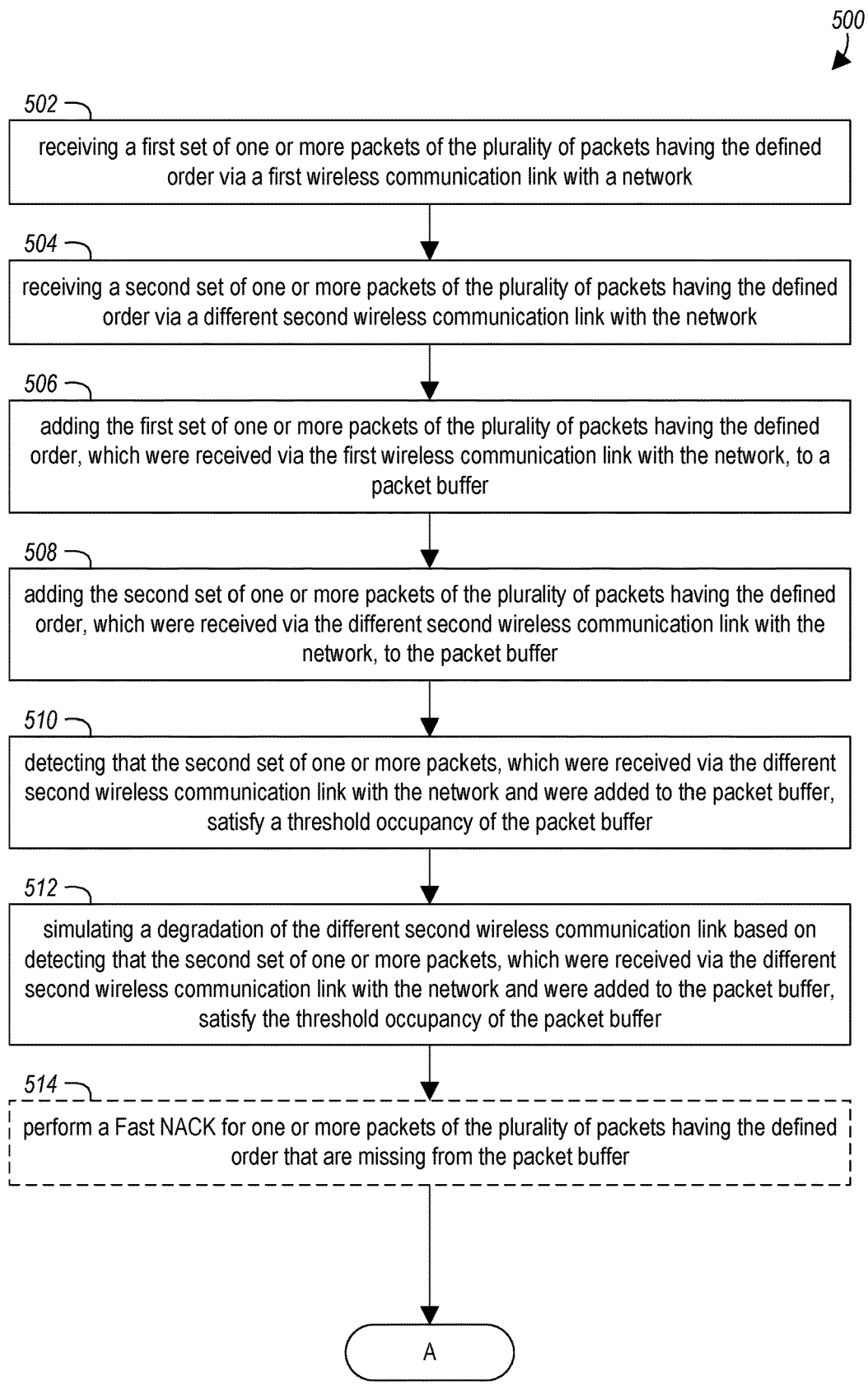
FIG. 5 is a flowchart illustrating a method for wireless communication according to some embodiments.

FIG. 5 is a flowchart illustrating a method 500 for receiving a plurality of packets having a defined order via wireless communication according to some embodiments, which may be performed by one or more processors of a user equipment—such as one or more processors 112 (FIG. 1) that may be configured with packet communication logic 116 which performs the method 500, performs other functionality (including other functionality described herein), or performs any combination thereof. As shown in FIG. 5, the method 500 may include one or more blocks, such as block 502, block 504, block 506, block 508, block 510, block 512, block 514, or any combination thereof.

At block 502, the processor may receive a first set of one or more packets of the plurality of packets having the defined order via a first wireless communication link with a network (e.g., using a first radio access technology, a first cell, a first numerology, a first carrier of a carrier aggregation, or any combination thereof). For example, the processor may receive a first set of one or more packets of a plurality of packets 202 having the defined order via the first wireless communication link 108 with the network 104 using the first radio access technology, the first cell, the first numerology, the first carrier of the carrier aggregation, or any combination thereof.

At block 504, the processor may receive a second set of one or more packets of the plurality of packets having the defined order via a different second wireless communication link with the network (e.g., using a different second radio access technology, using a different second cell, a different second numerology, a different second carrier of the carrier aggregation, or any combination thereof). For example, the processor may receive a second set of one or more packets of the plurality of packets 202 having the defined order via the different second wireless communication link 110 with the network 104 using the different second radio access technology, the different second cell, the different second numerology, the different second carrier of the carrier aggregation, or any combination thereof.

At block 506, the processor may add the first set of one or more packets of the plurality of packets having the defined order, which were received via the first wireless communication link with the network, to a packet buffer. For example, the processor may add the first set of one or more packets, which were received at block 502, to the packet buffer 114.

At block 508, the processor may add the second set of one or more packets of the plurality of packets having the defined order, which were received via the different second wireless communication link with the network, to the packet buffer. For example, the processor may add the second set of one or more packets, which were received at block 504, to the packet buffer 114.

At block 510, the processor may detect that the second set of one or more packets, which were received via the different second wireless communication link with the network and were added to the packet buffer, satisfy a threshold occupancy of the packet buffer. For example, the processor may detect that the second set of one or more packets, which were received at block 504 and added to the packet buffer at block 508, satisfy a threshold occupancy of the packet buffer 114.

At block 512, the processor may simulate a degradation of the different second wireless communication link based on detecting that the second set of one or more packets, which were received via the different second wireless communication link with the network and were added to the packet buffer, satisfy the threshold occupancy of the packet buffer. For example, based on detecting that the second set of one or more packets satisfy the threshold occupancy of the packet buffer at block 510, the processor may simulate a degradation of the different second wireless communication link 110. In some embodiments, simulating a degradation of the different second wireless communication link based on detecting that the second set of one or more packets satisfy the threshold occupancy of the packet buffer may comprise simulating a degradation of the different second wireless communication link based on (1) detecting that the first set of one or more packets and the second set of one or more packets collectively satisfy a first threshold occupancy of the packet buffer and (2) detecting that the second set of one or more packets satisfy a second threshold occupancy of the packet buffer (e.g., occupying more of the packet buffer than the first set of one or more packets occupies, occupying a defined amount of the packet buffer, occupying a defined amount of a packet sub-buffer, or the like).

The simulation of the degradation of the different second wireless communication link at block 512 may advantageously provide additional time to postpone and possibly avoid flushing the packet buffer when there are missing packets. In particular, with the additional time provided by the simulation of the degradation of the different second wireless communication link at block 512, one or more missing packets (such as, the missing packet 202 having sequence number 8 in FIG. 4E) may be received via the first wireless communication link and added to the packet buffer—which may then allow those previously missing packets and the other packets already in the buffer (such as, the packets 202 having sequence numbers 9 to N in FIG. 4E) to be removed from the packet buffer in the defined order without having to flush the packet buffer with missing packets.

The simulation of the degradation of the different second wireless communication link may provide the additional time because, for example, the simulation may trigger the network to slow the network's transmission of packets via the different second wireless communication link. When the network slows the network's transmission of packets via the different second wireless communication link, it may take more time for the packet buffer to be filled to a buffer-flush-triggering threshold occupancy. Also, for example, the simulation of the degradation of the different second wireless communication link may provide the additional time because the simulation may trigger the network to retransmit one or more packets via the different second wireless communication link. When the network retransmits one or more packets via the different second wireless communication link, it may take more time for the packet buffer to be filled to a buffer-flush-triggering threshold occupancy.

At block 514, the processor may perform a Fast NACK (e.g., at a radio link control, RLC, layer) for one or more packets of the plurality of packets having the defined order that are missing from the packet buffer, such as, missing packets scheduled to be received via the first wireless communication link. For example, the processor may perform the Fast NACK at block 514 based on detecting (at block 510) that the second set of one or more packets, which were received via the different second wireless communication link with the network and were added to the packet buffer, satisfy the threshold occupancy of the packet buffer. Also, for example, the processor may perform the Fast NACK at block 514 in response to the initiation of the simulation at block 512. As used herein, a Fast NACK occurs when an automatic repeat request protocol issues a negative acknowledgement earlier than it would have with the standard specification behavior, for instance, before a reordering timer has expired.

Figure 6:
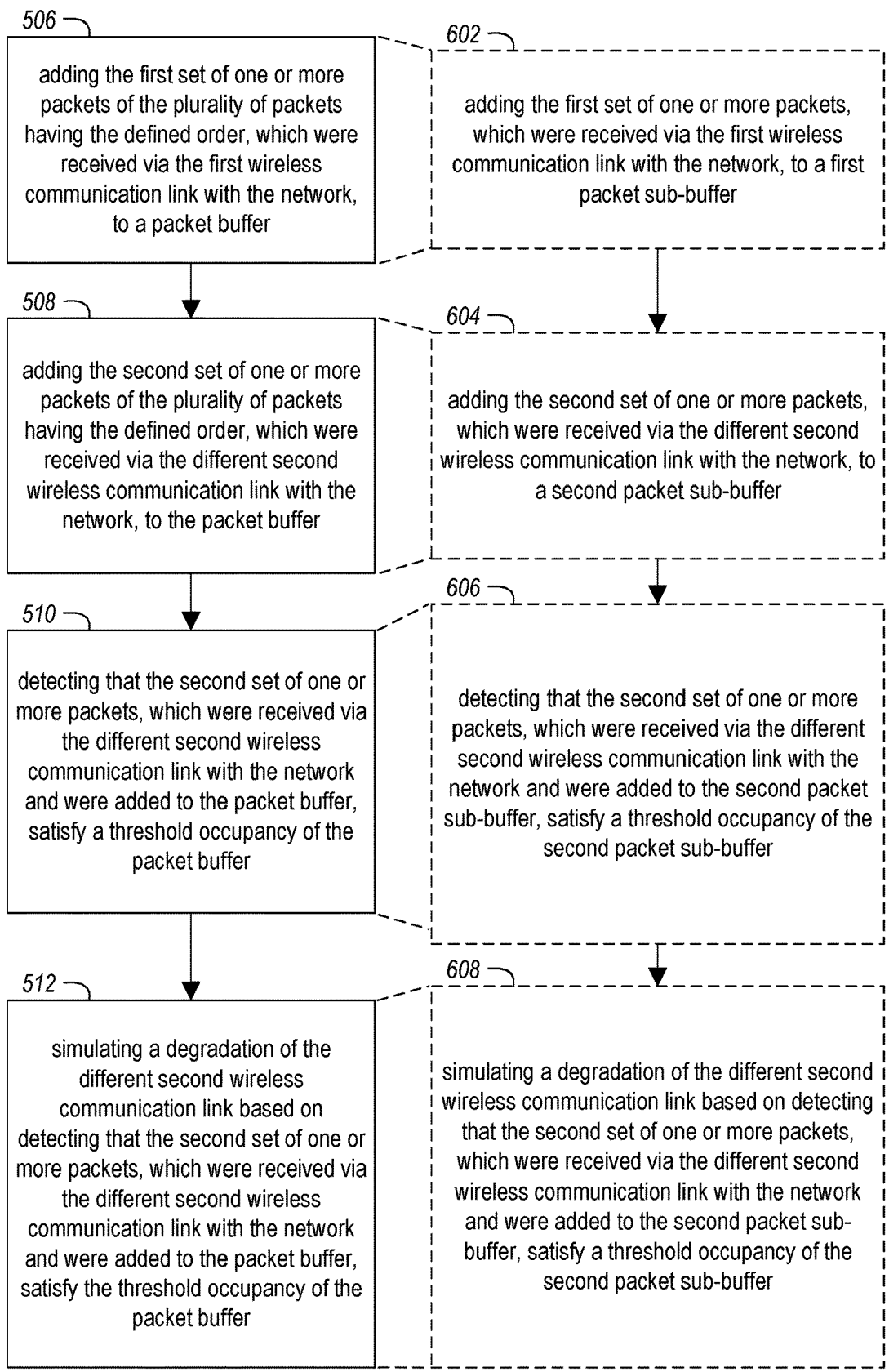
FIG. 6 is a flowchart illustrating a method for wireless communication according to some embodiments.

As shown in FIG. 6, block 506 (FIG. 5) may include one or more blocks, such as, optional block 602; block 508 (FIG. 5) may include one or more blocks, such as, optional block 604; block 510 (FIG. 5) may include one or more blocks, such as, optional block 606; and block 512 (FIG. 5) may include one or more blocks, such as, optional block 608. Optional blocks 602, 604, 606 and 608 may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 602, the processor may add the first set of one or more packets, which were received via the first wireless communication link with the network, to a first packet sub-buffer. The first packet sub-buffer may be allocated to the first wireless communication link with the network, the first radio access technology, the first cell, the first numerology, the first carrier of the carrier aggregation, or any combination thereof. For example, the processor may add the first set of one or more packets, which were received at block 502 in FIG. 5, to the first packet sub-buffer 402a.

At optional block 604, the processor may add the second set of one or more packets, which were received via the different second wireless communication link with the network, to a second packet sub-buffer. The second packet sub-buffer may be allocated to the different second wireless communication link with the network, the different second radio access technology, the different second cell, the different second numerology, the different second carrier of the carrier aggregation, or any combination thereof. For example, the processor may add the second set of one or more packets, which were received at block 504 in FIG. 5, to the second packet sub-buffer 402b.

At optional block 606, the processor may detect that the second set of one or more packets, which were received via the different second wireless communication link with the network and were added to the second packet sub-buffer, satisfy a threshold occupancy of the second packet sub-buffer. For example, the processor may detect that the second set of one or more packets, which were received at block 504 in FIG. 5 and added to the second packet sub-buffer 402b at optional block 604, satisfy a threshold occupancy of the second packet sub-buffer 402b.

At optional block 608, the processor may simulate a degradation of the different second wireless communication link based on detecting that the second set of one or more packets, which were received via the different second wireless communication link with the network and were added to the second packet sub-buffer, satisfy a threshold occupancy of the second packet sub-buffer. For example, the processor may simulate a degradation of the different second wireless communication link based on detecting, at optional block 606, that the second set of one or more packets satisfy a threshold occupancy of the second packet sub-buffer. This simulation of a degradation of the different second wireless communication link may advantageously provide additional time to postpone and possibly avoid flushing the packet buffer when there are missing packets, as discussed above with respect to FIG. 5.

Figure 7:
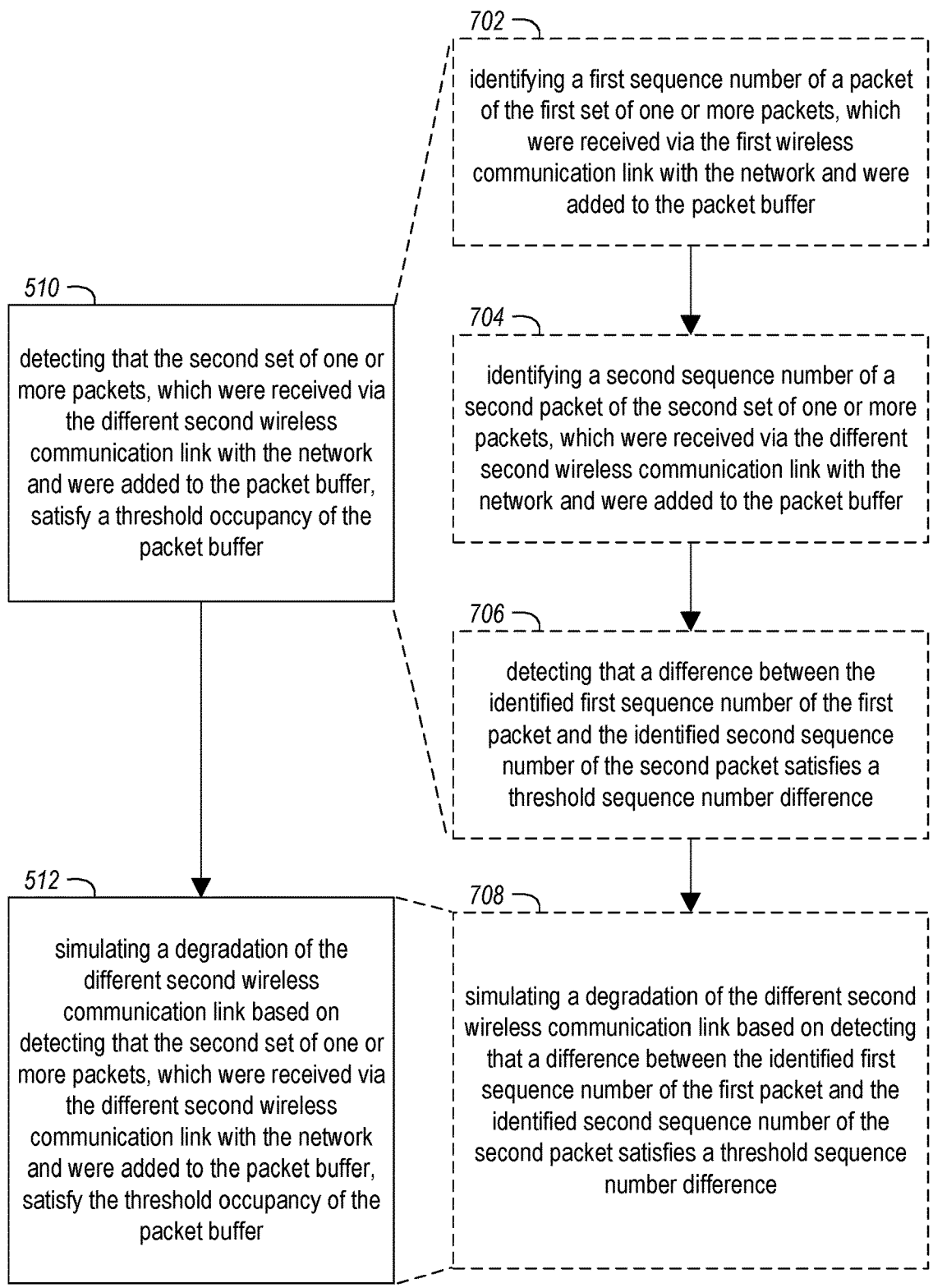
FIG. 7 is a flowchart illustrating a method for wireless communication according to some embodiments.

As shown in FIG. 7, block 510 (FIG. 5) may include one or more blocks, such as, optional block 702, optional block 704, and optional block 706; and block 512 (FIG. 5) may include one or more blocks, such as, optional block 708. Optional blocks 702, 704, 706 and 708 may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 702, the processor may identify a first sequence number of a packet of the first set of one or more packets, which were received via the first wireless communication link with the network and were added to the packet buffer. For example, the processor may identify a highest sequence number of the first set of one or more packets, which were received via the first wireless communication link with the network at block 502 in FIG. 5 and were added to the packet buffer at block 506 in FIG. 5.

At optional block 704, the processor may identify a second sequence number of a second packet of the second set of one or more packets, which were received via the different second wireless communication link with the network and were added to the packet buffer. For example, the processor may identify a highest sequence number of the second set of one or more packets, which were received via the different second wireless communication link with the network at block 504 in FIG. 5 and were added to the packet buffer at block 508 in FIG. 5.

At optional block 706, the processor may detect that a difference between the identified first sequence number of the first packet and the identified second sequence number of the second packet satisfies a threshold sequence number difference. In some embodiments, at optional block 706, the processor may detect a difference between a highest sequence number of the first set of one or more packets received and a highest sequence number of the second set of one or more packets received. For example, at optional block 706, the processor may detect that the highest sequence number of the second set of one or more packets in the packet buffer is a threshold-satisfying-amount higher than the highest sequence number of the first set of one or more packets in the packet buffer.

At optional block 708, the processor may simulate a degradation of the different second wireless communication link based on detecting that a difference between the identified first sequence number of the first packet and the identified second sequence number of the second packet satisfies a threshold sequence number difference. This simulation of a degradation of the different second wireless communication link may advantageously provide additional time to postpone and possibly avoid flushing the packet buffer when there are missing packets, as discussed above with respect to FIG. 5.

Figure 8:
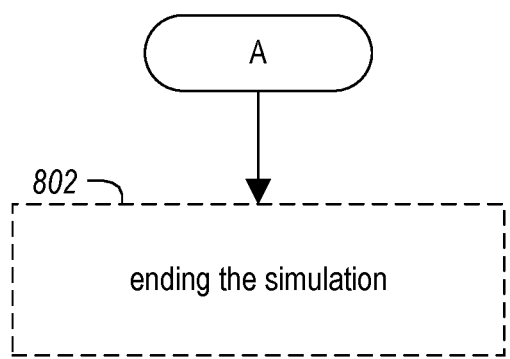
FIG. 8 is a flowchart illustrating a method for wireless communication according to some embodiments.

As shown in FIG. 5 and FIG. 8, the method 500 may further include optional block 802. Optional block 802 may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 802, the processor may end the simulation of the degradation of the different second wireless communication link, which was initiated at block 512 in FIG. 5, or end the simulation of the degradation of at least one of the first wireless communication link or the different second wireless communication link, which was initiated at block 1404 (FIG. 14).

Figure 9:
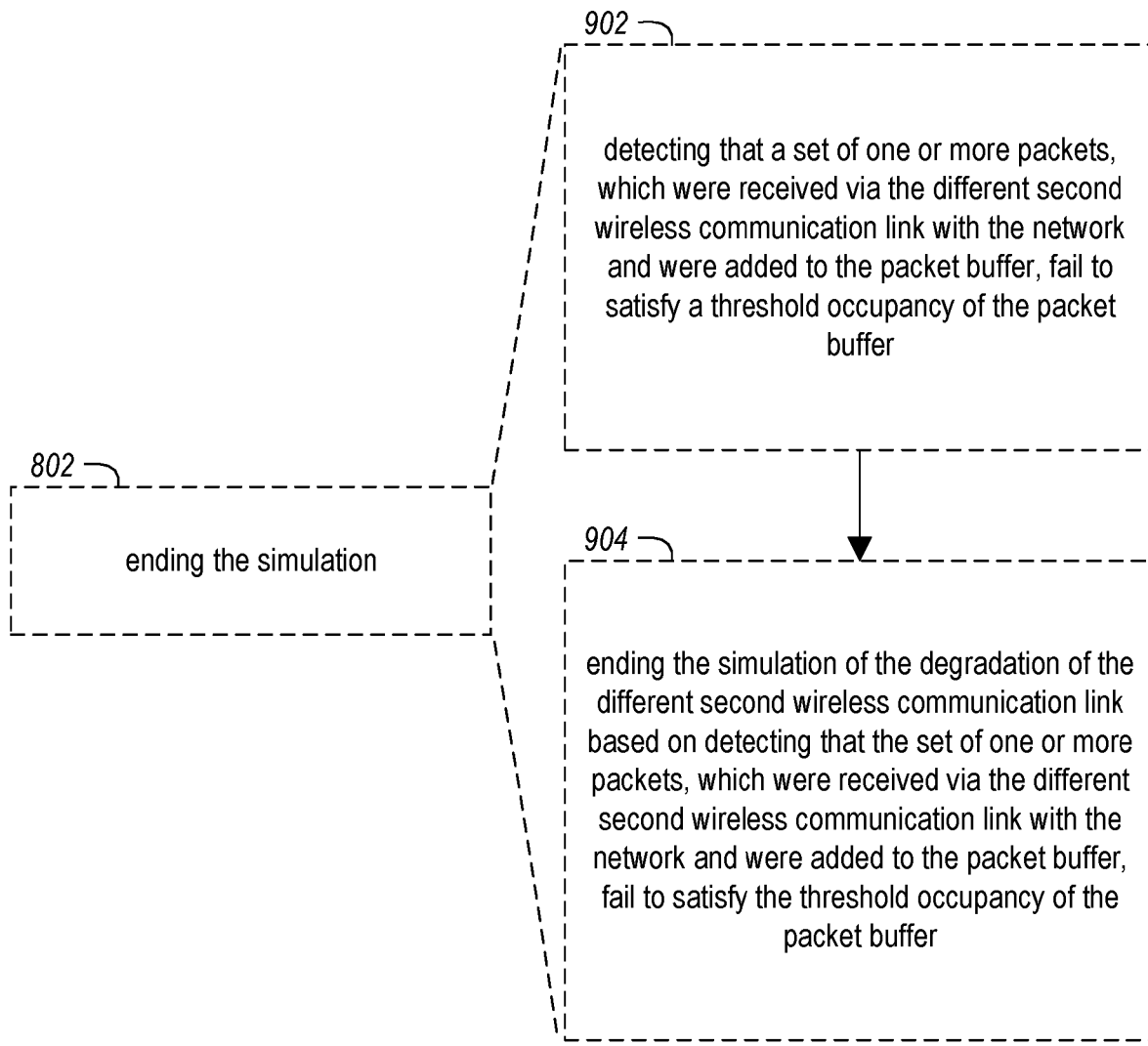
FIG. 9 is a flowchart illustrating a method for wireless communication according to some embodiments.

As shown in FIG. 9, optional block 802 (FIG. 8) may include one or more blocks, such as, optional block 902 and optional block 904, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 902, the processor may detect that a set of one or more packets, which were received via the different second wireless communication link with the network and were added to the packet buffer, fail to satisfy a threshold occupancy of the packet buffer.

At optional block 904, the processor may end the simulation of the degradation of the different second wireless communication link based on detecting that the set of one or more packets, which were received via the different second wireless communication link with the network and were added to the packet buffer, fail to satisfy the threshold occupancy of the packet buffer.

In further detail, as discussed above with respect to FIG. 5, the processor may detect at block 510 that the second set of one or more packets, which were received via the different second wireless communication link with the network and were added to the packet buffer, satisfy a threshold occupancy of the packet buffer and, based on that detection, may simulate a degradation of the different second wireless communication link at block 512. In some embodiments, at block optional 902, the processor may detect that one or more packets no longer satisfy the threshold occupancy of the packet buffer and, based on that detection, advantageously end the simulation of the degradation of the different second wireless communication link at optional block 904. In particular, by advantageously ending the simulation of the degradation of the different second wireless communication link, the network may transmit packets faster, which may provide an improved performance and improved user experience for the user equipment 102.

Figure 10:
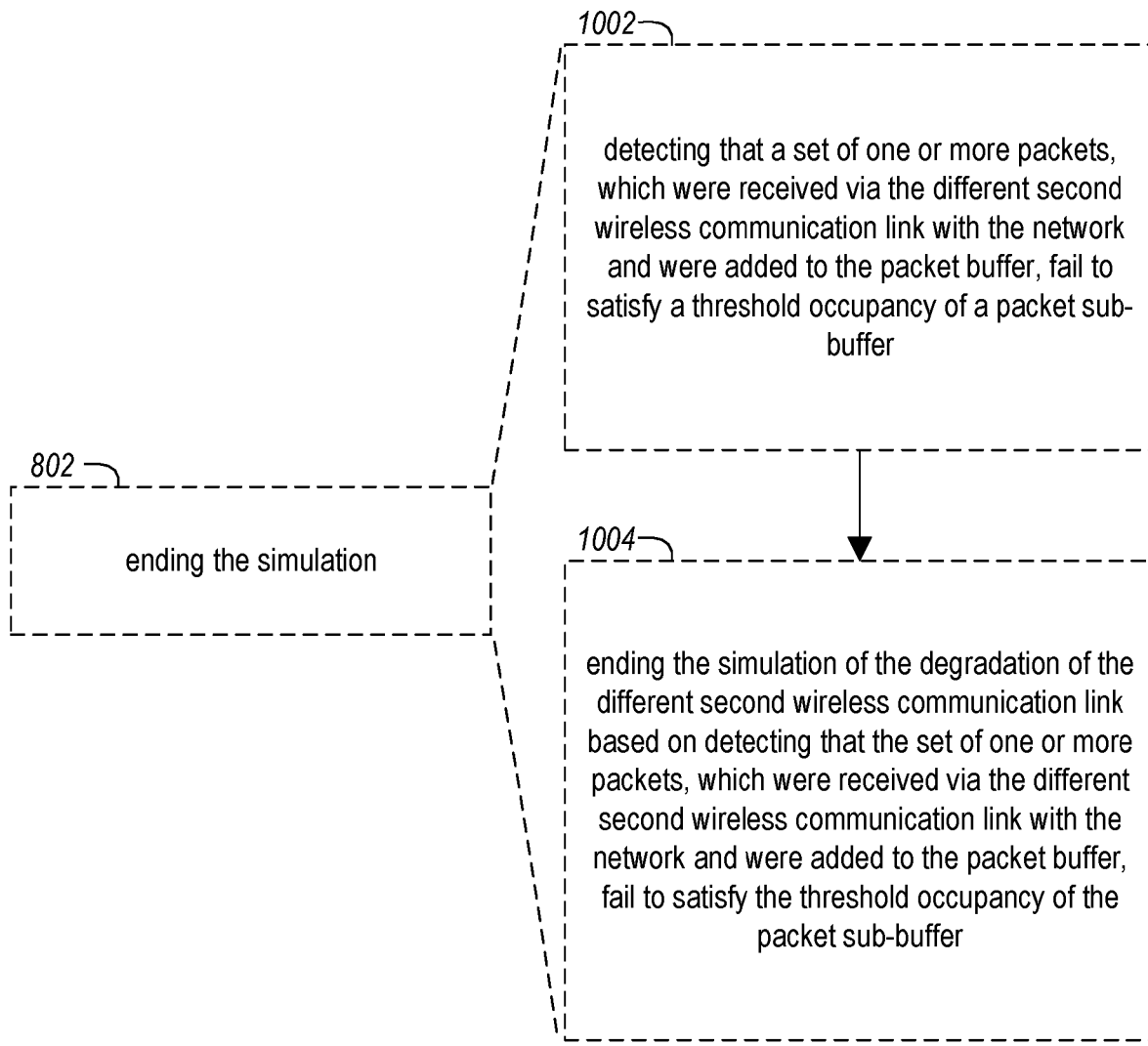
FIG. 10 is a flowchart illustrating a method for wireless communication according to some embodiments.

As shown in FIG. 10, optional block 802 (FIG. 8) may include one or more blocks, such as, optional block 1002 and optional block 1004, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 1002, the processor may detect that a set of one or more packets, which were received via the different second wireless communication link with the network and were added to the packet buffer, fail to satisfy a threshold occupancy of a packet sub-buffer allocated to the different second radio access technology.

At optional block 1004, the processor may end the simulation of the degradation of the different second wireless communication link based on detecting that the set of one or more packets, which were received via the different second wireless communication link with the network and were added to the packet buffer, fail to satisfy the threshold occupancy of the packet sub-buffer allocated to the different second radio access technology.

In further detail, as discussed above with respect to FIG. 6, the processor may detect at optional block 606 that the second set of one or more packets, which were received via the different second wireless communication link with the network and were added to the second packet sub-buffer allocated to the different second radio access technology, satisfy a threshold occupancy of the second packet sub-buffer allocated to the different second radio access technology and, based on that detection, may simulate a degradation of the different second wireless communication link at optional block 608. In some embodiments, at block optional 1002, the processor may detect that one or more packets no longer satisfy the threshold occupancy of the second packet sub-buffer and, based on that detection, advantageously end the simulation of the degradation of the different second wireless communication link at optional block 1004. In particular, by advantageously ending the simulation of the degradation of the different second wireless communication link, the network may transmit packets faster, which may provide an improved performance and improved user experience for the user equipment 102.

Figure 11:
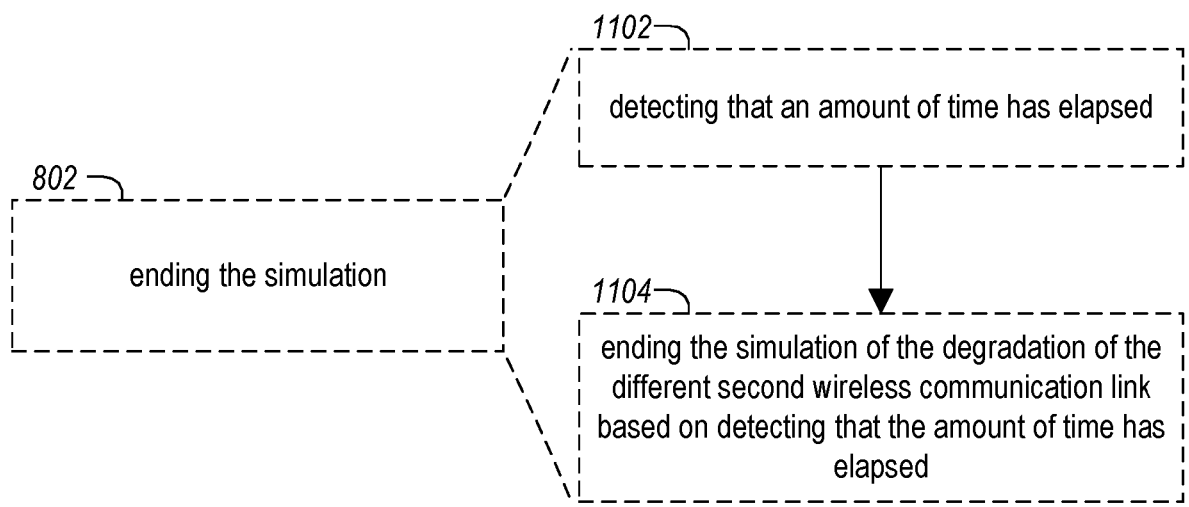
FIG. 11 is a flowchart illustrating a method for wireless communication according to some embodiments.

As shown in FIG. 11, optional block 802 (FIG. 8) may include one or more blocks, such as, optional block 1102 and optional block 1104, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 1102, the processor may detect that an amount of time has elapsed.

At optional block 1104, the processor may end the simulation of the degradation of the different second wireless communication link based on detecting that the amount of time has elapsed.

In further detail, as discussed above with respect to FIG. 5, the processor may detect at block 510 that the second set of one or more packets, which were received via the different second wireless communication link with the network and were added to the packet buffer, satisfy a threshold occupancy of the packet buffer and, based on that detection, may simulate a degradation of the different second wireless communication link at block 512. In some embodiments, at block optional 1102, the processor may detect that an amount of time has elapsed since the processor commenced the simulation of the degradation of the different second wireless communication link and, based on that detection, advantageously end the simulation of the degradation of the different second wireless communication link at optional block 1104. In particular, by advantageously ending the simulation of the degradation of the different second wireless communication link, the network may transmit packets faster, which may provide an improved performance and improved user experience for the user equipment 102.

In some embodiments, at optional block 1102, the processor may detect that a defined amount of time has elapsed, and at optional block 1104, the processor may end the simulation based on detecting that the defined amount of time has elapsed.

The defined amount of time, which may be detected at optional block 1102, may be based on an estimated total size of the packets missing from the packet buffer. For example, to estimate the total size of the packets missing from the packet buffer, the processor may calculate an average size of packets in the packet buffer and multiply that average size by the number of packets missing from the packet buffer. In this example, the processor may define the amount of time based on the estimated total size of the packets missing from the packet buffer, a throughput of the first wireless communication link (e.g., the "behind" link), a throughput of the different second wireless communication link (e.g., the "ahead" link subjected to the simulation), a protocol to which the packets will be sent (e.g., whether the protocol is UDP, which may create a preference to define the amount of time to prioritize total throughput, or whether the protocol is TCP, which may create a preference to define the amount of time to prioritize receiving the missing packet) or a combination thereof.

Figure 12A:
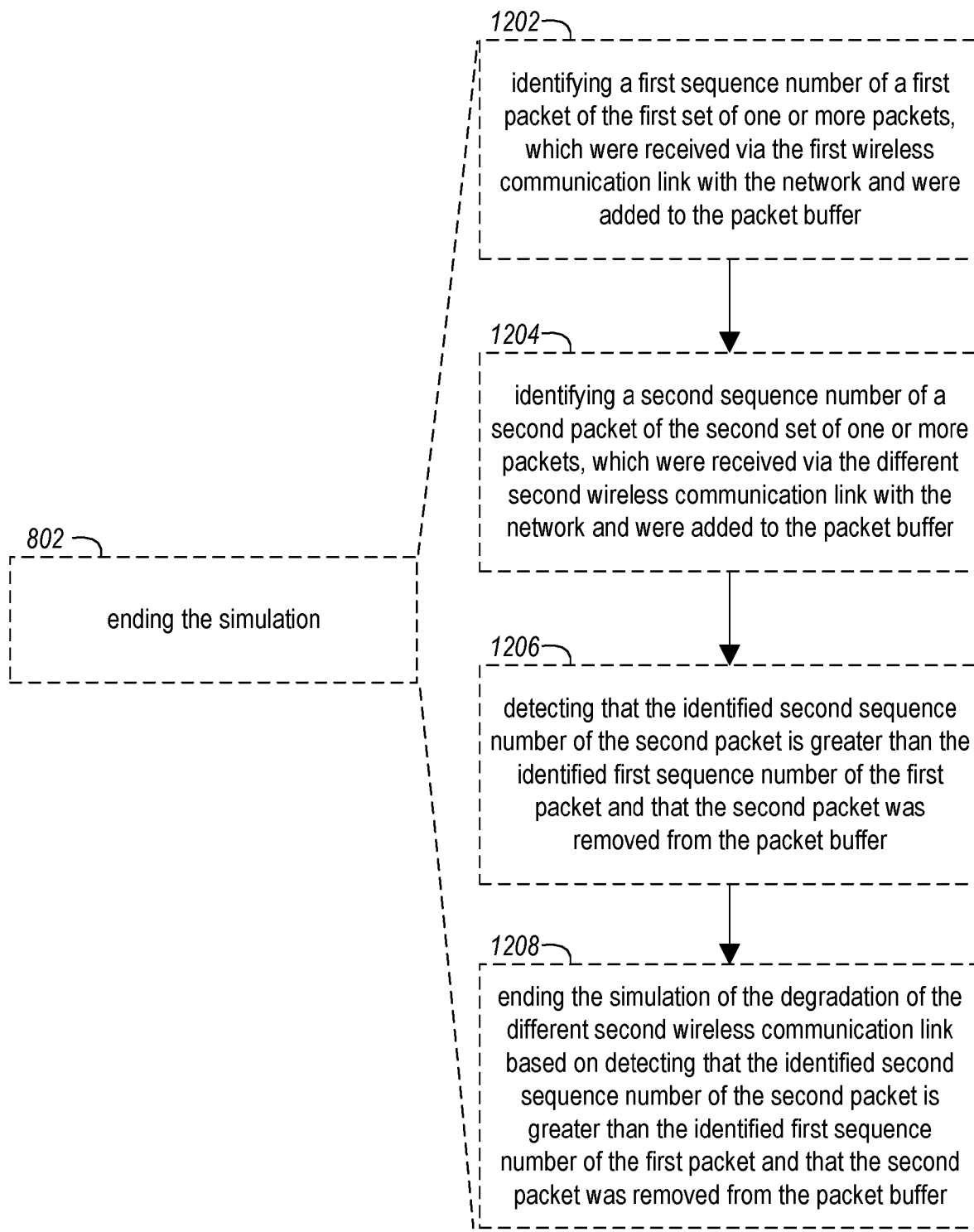
FIG. 12A is a flowchart illustrating a method for wireless communication according to some embodiments.

As shown in FIG. 12A, optional block 802 (FIG. 8) may include one or more blocks, such as, optional block 1202, optional block 1204, optional block 1206, and optional block 1208, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 1202, the processor may identify a first sequence number of a first packet of the first set of one or more packets, which were received via the first wireless communication link with the network and were added to the packet buffer. For example, the processor may identify a first packet having a lowest sequence number of any packet that was received via the first wireless communication link with the network and was in the packet buffer when, at block 512 in FIG. 5, the processor commenced the processor commenced the simulation of the degradation of the different second wireless communication link.

At optional block 1204, the processor may identify a second sequence number of a second packet of the second set of one or more packets, which were received via the different second wireless communication link with the network and were added to the packet buffer. For example, the processor may identify a second packet having a lowest sequence number of any packet that was received via the different second wireless communication link with the network and was in the packet buffer when, at block 512 in FIG. 5, the processor commenced the processor commenced the simulation of the degradation of the different second wireless communication link.

At optional block 1206, the processor may detect that the identified second sequence number of the second packet is greater than the identified first sequence number of the first packet and that the second packet was removed from the packet buffer.

At optional block 1208, the processor may end the simulation of the degradation of the different second wireless communication link based on detecting that the identified second sequence number of the second packet is greater than the identified first sequence number of the first packet and that the second packet was removed from the packet buffer.

In further detail, when the identified second sequence number of the second packet is greater than the identified first sequence number of the first packet and that the second packet is removed from the packet buffer, one or more missing packets may have been received via the wireless communication link, allowing the first wireless communication link to catch up with the different second wireless communication link. When the first wireless communication link catches up with the different wireless communication link, the simulation of the degradation of the different second wireless communication link may not be needed. Accordingly, the processor may advantageously end the simulation of the degradation of the different second wireless communication link at optional block 1208. In particular, by advantageously ending the simulation of the degradation of the different second wireless communication link, the network may transmit packets faster, which may provide an improved performance and improved user experience for the user equipment 102.

Figure 12B:
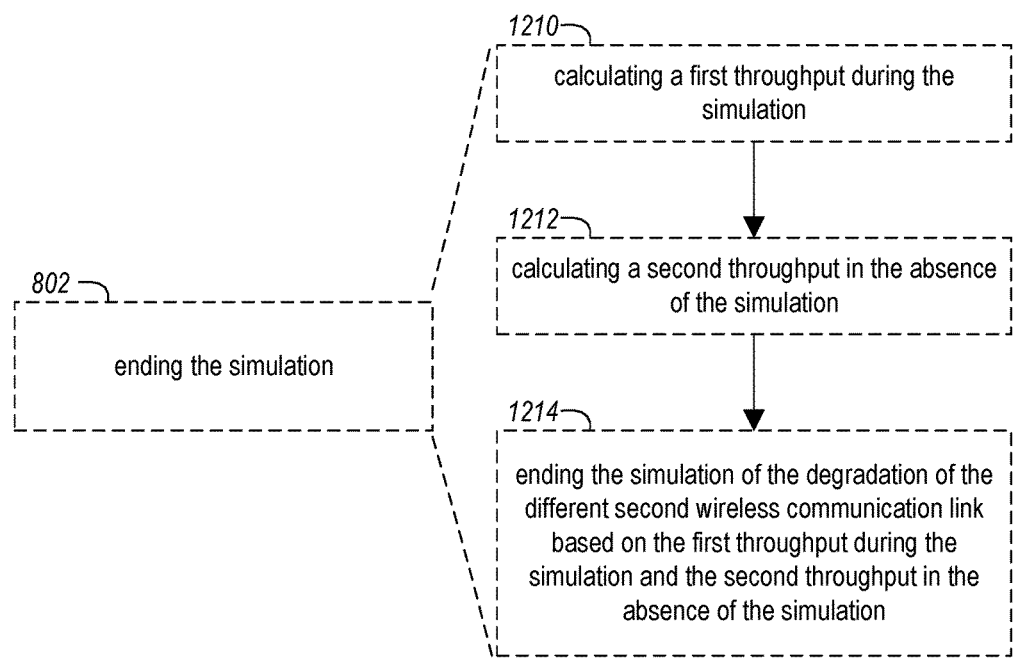
FIG. 12B is a flowchart illustrating a method for wireless communication according to some embodiments.

As shown in FIG. 12B, optional block 802 (FIG. 8) may include one or more blocks, such as, optional block 1210, optional block 1212, and optional block 1214, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 1210, the processor may calculate a first throughput during the simulation.

At optional block 1212, the processor may calculate a second throughput in the absence of the simulation.

At optional block 1214, the processor may end the simulation of the degradation of the different second wireless communication link based on the first throughput during the simulation and the second throughput in the absence of the simulation. For example, based on the first throughput during the simulation and the second throughput in the absence of the simulation, the processor may determine that using the simulation results in a lower overall throughput than the overall throughput that would occur in the absence of the simulation and, based on that determination, the processor may end the simulation. As one example, the first wireless communication link and the second wireless communication link could collectively average a total 1.5 gigabits per second (Gbps) when the simulation occurs fifty percent of the time, but the second wireless communication link could average 2.0 gigabits per second (Gbps) by itself with no communication via the first wireless communication link. Accordingly, in this example, the processor may end the simulation at optional block 1214 and may disable communication over the first wireless communication link for a defined period of time.

In some embodiments, at optional block 1214, the processor may, based on the first throughput during the simulation and the second throughput in the absence of the simulation, end the simulation of the degradation of the different second wireless communication link, disable the simulation functionality for a defined period time, disable communication over the first wireless communication link for a defined period of time, or any combination thereof.

Figure 13:
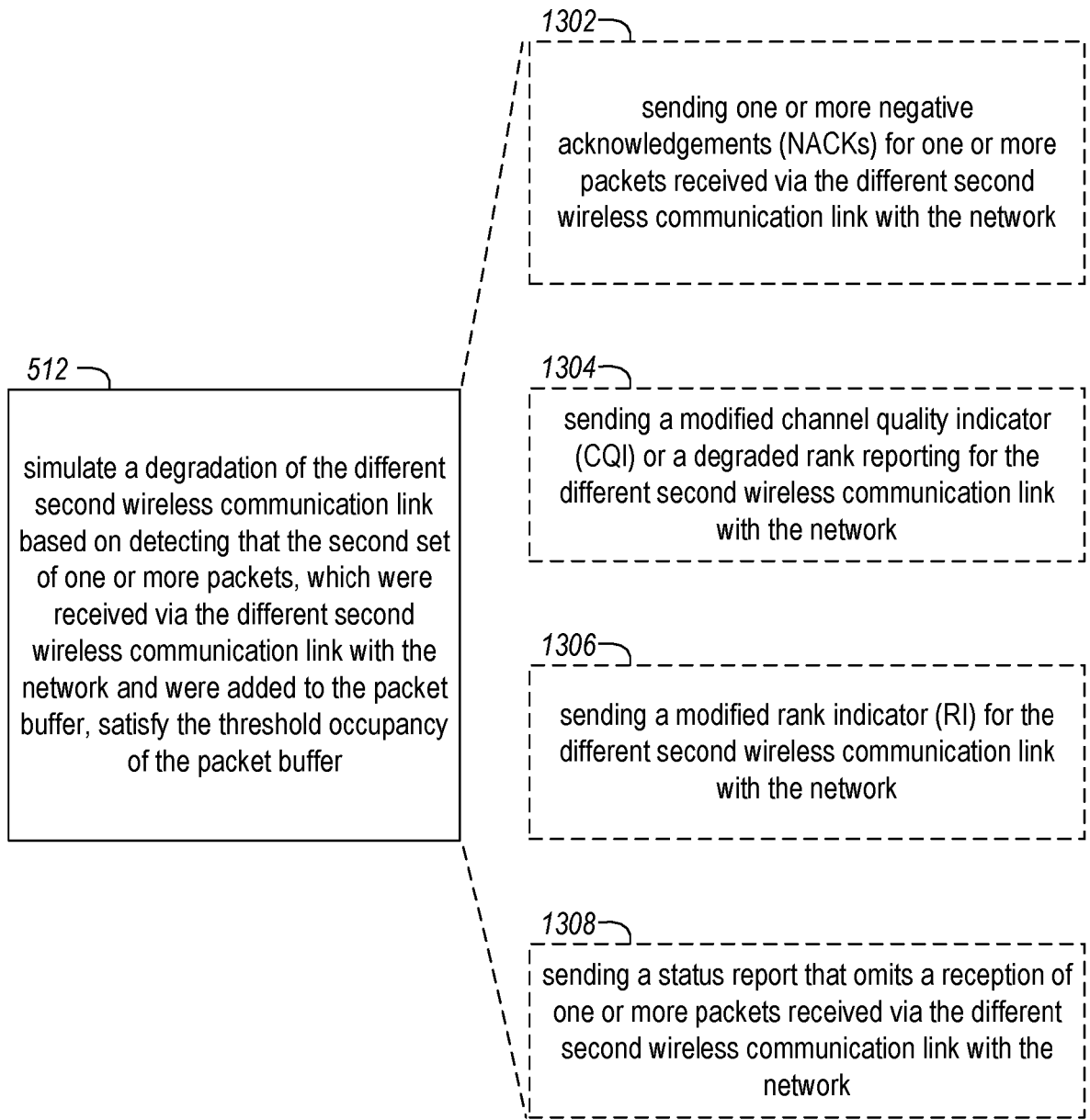
FIG. 13 is a flowchart illustrating a method for wireless communication according to some embodiments.

As shown in FIG. 13, block 512 (FIG. 5) may include one or more blocks, such as, optional block 1302, optional block 1304, optional block 1306, or optional block 1308, which may be performed by one or more processors of a user equipment—such as one or more processors 112 (FIG. 1) that may be configured with packet communication logic 116 which performs one or more of these blocks, performs other functionality (including other functionality described herein), or performs any combination thereof.

At optional block 1302, the processor may send one or more negative acknowledgements (NACKs), e.g., one or more physical layer NACKs, for one or more packets received via the different second wireless communication link with the network. Sending the one or more NACKs may trigger the network to retransmit one or more packets via the different second wireless communication link. When the network retransmits one or more packets via the different second wireless communication link, it may take more time for the packet buffer to be filled to a buffer-flush-triggering threshold occupancy. This additional time may advantageously provide additional time to postpone and possibly avoid flushing the packet buffer when there are missing packets, as discussed above with respect to FIG. 5. In some embodiments, the processor may be configured to limit the number of NACKs the processor sends for a packet (at block 1302) based on a defined threshold number of NACKs. For example, the processor may be configured to send up to the defined threshold number of NACKs for the particular packet, but not more NACKs, to avoid an eventual HARQ failure.

At optional block 1304, the processor may send a modified (e.g., degraded from an actual channel quality) channel quality indicator (CQI) or a degraded rank reporting for the different second wireless communication link with the network. Sending the modified CQI may trigger the network to slow the network's transmission of packets via the different second wireless communication link. When the network slows the network's transmission of packets via the different second wireless communication link, it may take more time for the packet buffer to be filled to a buffer-flush-triggering threshold occupancy. This additional time may advantageously provide additional time to postpone and possibly avoid flushing the packet buffer when there are missing packets, as discussed above with respect to FIG. 5. In some embodiments, sending the modified CQI may be particularly advantageous when the user equipment is configured to perform periodic CQI reporting according to a period that is sufficiently short. Accordingly, if desired, when the configured period is less than a defined threshold, sending the modified CQI may be enabled as an option for simulating degradation, and when the configured period is greater than or equal to the defined threshold, sending the modified CQI may be disabled as an option for simulating degradation.

At optional block 1306, the processor may send a modified rank indicator (RI) for the different second wireless communication link with the network. Sending the modified RI may trigger the network to slow the network's transmission of packets via the different second wireless communication link. When the network slows the network's transmission of packets via the different second wireless communication link, it may take more time for the packet buffer to be filled to a buffer-flush-triggering threshold occupancy. This additional time may advantageously provide additional time to postpone and possibly avoid flushing the packet buffer when there are missing packets, as discussed above with respect to FIG. 5.

At optional block 1308, the processor may send a status report that omits a reception of one or more packets received via the different second wireless communication link with the network. Sending the status report that omits a reception of one or more packets received via the different second wireless communication link with the network may trigger the network to retransmit one or more packets via the different second wireless communication link or may stall the network as its transmit window is full and no status is available for the transmitted packets. When the network retransmits one or more packets via the different second wireless communication link or the network is stalled with its transmit window is full and no status is available for the transmitted packets, it may take more time for the packet buffer to be filled to a buffer-flush-triggering threshold occupancy. This additional time may advantageously provide additional time to postpone and possibly avoid flushing the packet buffer when there are missing packets, as discussed above with respect to FIG. 5.

Figure 15:
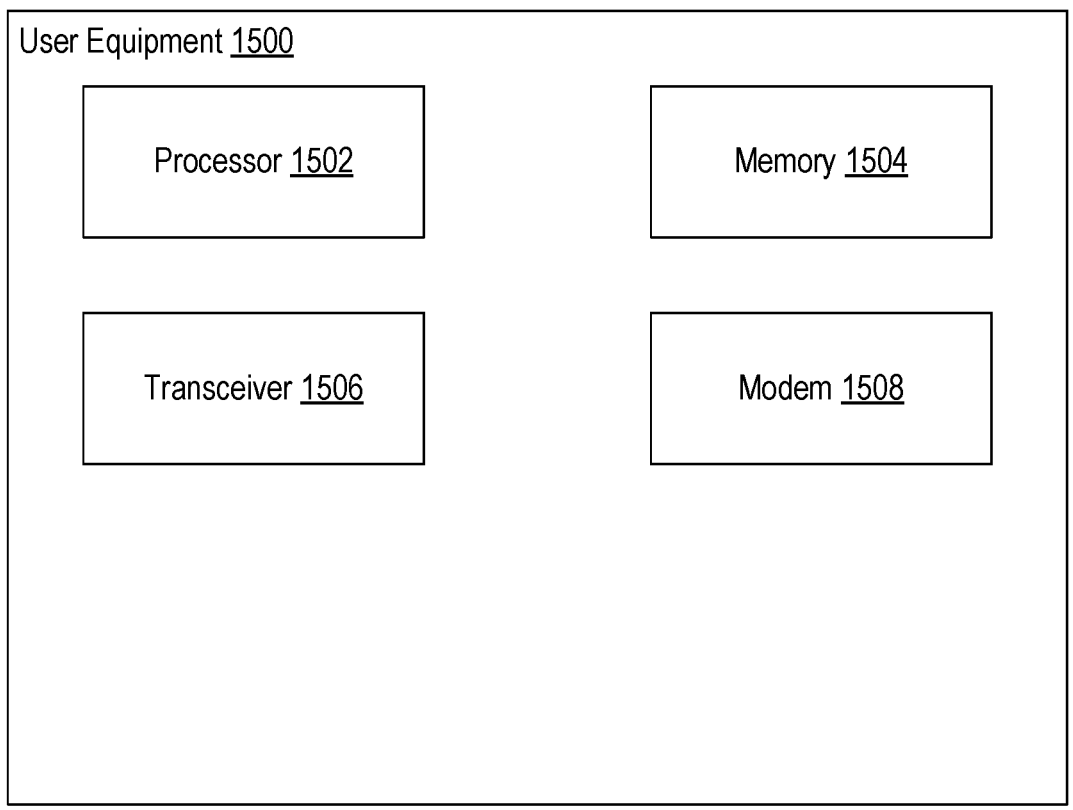
FIG. 15 is a diagram illustrating a user equipment according to some embodiments.

FIG. 14 is a flowchart illustrating a method 1400 for receiving a plurality of packets having a defined order via wireless communication according to some embodiments, which may be performed by one or more processors of a user equipment—such as one or more processors 112 (FIG. 1) that may be configured with packet communication logic 116 which performs the method 1400, performs other functionality (including other functionality described herein), or performs any combination thereof. As shown in FIG. 15, the method 1400 may include one or more blocks, such as block 502 (FIG. 5), block 504 (FIG. 5), block 506 (FIG. 5), block 508 (FIG. 5), block 1402, block 1404, block 514 (FIG. 5) or any combination thereof.

At block 1402, the processor may detect that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer.

At block 1404, the processor may simulate a degradation of at least one of the first wireless communication link or the different second wireless communication link based on detecting that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer. In some embodiments, the simulation of the degradation of at least one of the first wireless communication link or the different second wireless communication link may comprise (1) sending one or more negative acknowledgements (NACKs) for one or more packets received via the at least one of the first wireless communication link or the different second wireless communication link, such as discussed above with respect to block 1302; (2) sending a modified channel quality indicator (CQI) for the at least one of the first wireless communication link or the different second wireless communication link, such as discussed above with respect to block 1304; (3) sending a modified rank indicator (RI) for the at least one of the first wireless communication link or the different second wireless communication link, such as discussed above with respect to block 1306; (4) sending a status report that omits a reception of one or more packets received via the at least one of the first wireless communication link or the different second wireless communication link, such as discussed above with respect to block 1308; or any combination thereof.

In some embodiments, at block 1404, the processor may simulate a degradation of the first wireless communication link based on detecting that the first set of one or more packets and the second set of one or more packets collectively satisfy a threshold occupancy of the packet buffer at block 1402 and further based on the first set of one or more packets occupying more of the packet buffer than the second set of one or more packets.

In some embodiments, at block 1404, the processor may simulate a degradation of the first wireless communication link based on detecting that the first set of one or more packets and the second set of one or more packets collectively satisfy a first threshold occupancy of the packet buffer at block 1402 and further based on the first set of one or more packets satisfying a second threshold occupancy of the packet buffer.

In some embodiments, at block 1404, the processor may simulate both a degradation of the first wireless communication link and a degradation of the first wireless communication link based on detecting that the first set of one or more packets and the second set of one or more packets collectively satisfy a first threshold occupancy of the packet buffer at block 1402 and further based on the first set of one or more packets satisfying a second threshold occupancy of the packet buffer and further based on the second set of one or more packets satisfying a third threshold occupancy of the packet buffer.

Various embodiments (including, but not limited to, embodiments discussed above with reference to FIGS. 1-14) may be implemented in any user equipment, one example of which is illustrated in FIG. 15. For example, the user equipment 1500 may include one or more processors 1502 coupled to a touch screen controller and one or more internal memory 1504. The processor 1502 may be one or more multicore integrated circuits designated for general or specific processing tasks. The internal memory 1504 may be volatile or non-volatile memory, and may also be secure and/or encrypted memory, or unsecure and/or unencrypted memory, or any combination thereof. The touch screen controller and the processor 1502 may also be coupled to a touch screen panel, such as a resistive-sensing touch screen, capacitive-sensing touch screen, infrared sensing touch screen, etc. The user equipment 1500 may have one or more radio signal transceivers 1506 (e.g., Peanut®, Bluetooth®, Zigbee®, Wi-Fi, RF, cellular, etc.) and antennae, for sending and receiving, coupled to each other and/or to the processor 1502. The transceiver 1506 and antennae may be used with the above-mentioned circuitry to implement the various wireless transmission protocol stacks and interfaces. The user equipment 1500 may include one or more cellular network wireless modem processors 1508 that enable communication via one or more cellular networks and that are coupled to the processor.

The user equipment 1500 may include a peripheral device connection interface coupled to the processor 1502. The peripheral device connection interface may be singularly configured to accept one type of connection, or multiply configured to accept various types of physical and communication connections, common or proprietary, such as USB, FireWire, Thunderbolt, Ethernet, or PCIe. The peripheral device connection interface may also be coupled to a similarly configured peripheral device connection port. The user equipment 1500 may also include speakers for providing audio outputs.

The user equipment 1500 may also include a housing— which may be constructed of plastic, metal, one or more other materials, or a combination of thereof—for containing all or some of the components discussed herein. The user equipment 1500 may include a power source coupled to the processor 1502, such as a disposable or rechargeable battery. The rechargeable battery may also be coupled to the peripheral device connection port to receive a charging current from a source external to the user equipment 1500.

The processor 1502 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processor 1502. The processor 1502 and may include internal memory sufficient to store the application software instructions. In many devices, the internal memory may be a volatile or nonvolatile memory, such as flash memory, or a mixture of both. For the purposes of this description, a general reference to memory refers to memory accessible by the processor 1502 including internal memory or removable memory plugged into the device and memory within the processor 1502 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The methods and systems described above require no particular component or function. Thus, any described component or function—despite its advantages—is optional. Also, some or all of the described components and functions described above may be used in connection with any number of other suitable components and functions.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

Moreover, although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus for receiving a plurality of packets having a defined order via wireless communication, the apparatus comprising:
one or more processors configured with processor-executable instructions to perform operations comprising:
receiving a first set of one or more packets of the plurality of packets having the defined order via a first wireless communication link with a network;
receiving a second set of one or more packets of the plurality of packets having the defined order via a different second wireless communication link with the network;
adding the first set of one or more packets of the plurality of packets having the defined order, which were received via the first wireless communication link with the network, to a packet buffer;
adding the second set of one or more packets of the plurality of packets having the defined order, which were received via the different second wireless communication link with the network, to the packet buffer;
detecting, based at least in part on the first set of one or more packets and the second set of one or more packets being added to the packet buffer and the defined order, that the second set of one or more packets satisfy a threshold occupancy of the packet buffer; and
simulating a degradation of the different second wireless communication link based on the detecting that the second set of one or more packets, which were received via the different second wireless communication link with the network and were added to the packet buffer, satisfy the threshold occupancy of the packet buffer.

2. The apparatus of claim 1, wherein the receiving the first set of one or more packets of the plurality of packets having the defined order via the first wireless communication link with the network, comprises:
receiving the first set of one or more packets of the plurality of packets having the defined order via the first wireless communication link with the network using a first radio access technology; and
wherein the receiving the second set of one or more packets of the plurality of packets having the defined order via the different second wireless communication link with the network, comprises:
receiving the second set of one or more packets of the plurality of packets having the defined order via the different second wireless communication link with the network using a different second radio access technology.

3. The apparatus of claim 1, wherein the receiving the first set of one or more packets of the plurality of packets having the defined order via the first wireless communication link with the network, comprises:
receiving the first set of one or more packets of the plurality of packets having the defined order via the first wireless communication link with the network using a first cell; and
wherein the receiving the second set of one or more packets of the plurality of packets having the defined order via the different second wireless communication link with the network, comprises:
receiving the second set of one or more packets of the plurality of packets having the defined order via the different second wireless communication link with the network using a different second cell.

4. The apparatus of claim 1, wherein the receiving the first set of one or more packets of the plurality of packets having the defined order via the first wireless communication link with the network, comprises:

receiving the first set of one or more packets of the plurality of packets having the defined order via the first wireless communication link with the network using a first numerology; and wherein the receiving the second set of one or more packets of the plurality of packets having the defined order via the different second wireless communication link with the network, comprises:

receiving the second set of one or more packets of the plurality of packets having the defined order via the different second wireless communication link with the network using a different second numerology.

5. The apparatus of claim 1, wherein the receiving the first set of one or more packets of the plurality of packets having the defined order via the first wireless communication link with the network, comprises:

receiving the first set of one or more packets of the plurality of packets having the defined order via the first wireless communication link with the network using a first carrier of a carrier aggregation; and wherein the receiving the second set of one or more packets of the plurality of packets having the defined order via the different second wireless communication link with the network, comprises:

receiving the second set of one or more packets of the plurality of packets having the defined order via the different second wireless communication link with the network using a different second carrier of the carrier aggregation.

6. The apparatus of claim 1, wherein the adding the first set of one or more packets of the plurality of packets having the defined order, which were received via the first wireless communication link with the network, to the packet buffer, comprises:

adding the first set of one or more packets, which were received via the first wireless communication link with the network, to a first packet sub-buffer allocated to a first radio access technology;

wherein the adding the second set of one or more packets of the plurality of packets having the defined order, which were received via the different second wireless communication link with the network, to the packet buffer, comprises:

adding the second set of one or more packets, which were received via the different second wireless communication link with the network, to a second packet sub-buffer allocated to a different second radio access technology;

wherein the detecting that the second set of one or more packets, which were received via the different second wireless communication link with the network and were added to the packet buffer, satisfy the threshold occupancy of the packet buffer, comprises:

detecting that the second set of one or more packets, which were received via the different second wireless communication link with the network and were added to the second packet sub-buffer allocated to the different second radio access technology, satisfy a threshold occupancy of the second packet sub-buffer allocated to the different second radio access technology; and wherein the simulating the degradation of the different second wireless communication link based on the detecting that the second set of one or more packets, which were received via the different second wireless communication link with the network and were added to the packet buffer, satisfy the threshold occupancy of the packet buffer, comprises:

simulating the degradation of the different second wireless communication link based on the detecting that the second set of one or more packets, which were received via the different second wireless communication link with the network and were added to the second packet sub-buffer allocated to the different second radio access technology, satisfy the threshold occupancy of the second packet sub-buffer allocated to the different second radio access technology.

7. The apparatus of claim 1, wherein the detecting that the second set of one or more packets, which were received via the different second wireless communication link with the network and were added to the packet buffer, satisfy the threshold occupancy of the packet buffer, comprises:

identifying a first sequence number of a first packet of the first set of one or more packets, which were received via the first wireless communication link with the network and were added to the packet buffer;

identifying a second sequence number of a second packet of the second set of one or more packets, which were received via the different second wireless communication link with the network and were added to the packet buffer; and detecting that a difference between the identified first sequence number of the first packet and the identified second sequence number of the second packet satisfies a threshold sequence number difference; and wherein the simulating the degradation of the different second wireless communication link based on the detecting that the second set of one or more packets, which were received via the different second wireless communication link with the network and were added to the packet buffer, satisfy the threshold occupancy of the packet buffer, comprises:

simulating the degradation of the different second wireless communication link based on the detecting that the difference between the identified first sequence number of the first packet and the identified second sequence number of the second packet satisfies the threshold sequence number difference.

8. The apparatus of claim 1, wherein the one or more processors are further configured with processor-executable instructions to perform operations comprising:

detecting that a set of one or more packets, which were received via the different second wireless communication link with the network and were added to the packet buffer, fail to satisfy the threshold occupancy of the packet buffer; and ending the simulation of the degradation of the different second wireless communication link based on the detecting that the set of one or more packets, which were received via the different second wireless communication link with the network and were added to the packet buffer, fail to satisfy the threshold occupancy of the packet buffer.

9. The apparatus of claim 6, wherein the one or more processors are further configured with processor-executable instructions to perform operations comprising:

detecting that a set of one or more packets, which were received via the different second wireless communication link with the network and were added to the packet buffer, fail to satisfy a threshold occupancy of the second packet sub-buffer allocated to the different second radio access technology; and ending the simulation of the degradation of the different second wireless communication link based on the detecting that the set of one or more packets, which were received via the different second wireless communication link with the network and were added to the packet buffer, fail to satisfy the threshold occupancy of the second packet sub-buffer allocated to the different second radio access technology.

10. The apparatus of claim 1, wherein the one or more processors are further configured with processor-executable instructions to perform operations comprising:
detecting that an amount of time has elapsed; and
ending the simulation of the degradation of the different second wireless communication link based on the detecting that the amount of time has elapsed.

11. The apparatus of claim 10, wherein the amount of time comprises a defined amount of time.

12. The apparatus of claim 11, wherein the one or more processors are further configured with processor-executable instructions to perform operations comprising:
defining the defined amount of time based on at least one of an estimated total size of one or more packets missing from the packet buffer, a throughput of the first wireless communication link, a throughput of the different second wireless communication link, a protocol to which one or more packets will be sent, or a combination thereof.

13. The apparatus of claim 1, wherein the one or more processors are further configured with processor-executable instructions to perform operations comprising:
identifying a first sequence number of a first packet of the first set of one or more packets, which were received via the first wireless communication link with the network and were added to the packet buffer;
identifying a second sequence number of a second packet of the second set of one or more packets, which were received via the different second wireless communication link with the network and were added to the packet buffer;
detecting that the identified second sequence number of the second packet is greater than the identified first sequence number of the first packet and that the second packet was removed from the packet buffer; and
ending the simulation of the degradation of the different second wireless communication link based on detecting that the identified second sequence number of the second packet is greater than the identified first sequence number of the first packet and that the second packet was removed from the packet buffer.

14. The apparatus of claim 1, wherein the simulating the degradation of the different second wireless communication link, comprises one or more of:
sending one or more negative acknowledgements (NACKs) for one or more packets received via the different second wireless communication link with the network;
sending a modified channel quality indicator (CQI) or a degraded rank reporting for the different second wireless communication link with the network;
sending a modified rank indicator (RI) for the different second wireless communication link with the network; or
sending a status report that omits a reception of one or more packets received via the different second wireless communication link with the network.

15. The apparatus of claim 1, wherein the one or more processors are further configured with processor-executable instructions to perform operations comprising:
performing a Fast NACK for one or more packets of the plurality of packets having the defined order that are missing from the packet buffer.

16. The apparatus of claim 1, wherein the one or more processors are further configured with processor-executable instructions to perform operations comprising:
calculating a first throughput during the simulation;
calculating a second throughput in an absence of the simulation; and
ending the simulation of the degradation of the different second wireless communication link based on the first throughput during the simulation and the second throughput in the absence of the simulation.

17. An apparatus for receiving a plurality of packets having a defined order via wireless communication, the apparatus comprising:
one or more processors configured with processor-executable instructions to perform operations comprising:
receiving a first set of one or more packets of the plurality of packets having the defined order via a first wireless communication link with a network;
receiving a second set of one or more packets of the plurality of packets having the defined order via a different second wireless communication link with the network;
adding the first set of one or more packets of the plurality of packets having the defined order, which were received via the first wireless communication link with the network, to a packet buffer;
adding the second set of one or more packets of the plurality of packets having the defined order, which were received via the different second wireless communication link with the network, to the packet buffer;
detecting, based at least in part on the defined order, that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer; and
simulating a degradation of at least one of the first wireless communication link or the different second wireless communication link based on detecting that the first set of one or more packets, which were received via the first wireless communication link with the network and were added to the packet buffer, and the second set of one or more packets, which were received via the different second wireless communication link with the network and were added to the packet buffer, satisfy the threshold occupancy of the packet buffer.

18. An apparatus for receiving a plurality of packets having a defined order via wireless communication, the apparatus comprising:
one or more processors configured with processor-executable instructions to perform operations comprising:
receiving a first set of one or more packets of the plurality of packets having the defined order via a first wireless communication link with a network;
receiving a second set of one or more packets of the plurality of packets having the defined order via a different second wireless communication link with the network;

adding the first set of one or more packets of the plurality of packets having the defined order, which were received via the first wireless communication link with the network, to a packet buffer;

adding the second set of one or more packets of the plurality of packets having the defined order, which were received via the different second wireless communication link with the network, to the packet buffer;

identifying a first sequence number of a packet of the first set of one or more packets, which were received via the first wireless communication link with the network and were added to the packet buffer;

identifying a second sequence number of a second packet of the second set of one or more packets, which were received via the different second wireless communication link with the network and were added to the packet buffer;

detecting that a difference between the identified first sequence number of the first packet and the identified second sequence number of the second packet satisfies a threshold sequence number difference; and simulating a degradation of the different second wireless communication link based on detecting that a difference between the identified first sequence number of the first packet and the identified second sequence number of the second packet satisfies the threshold sequence number difference.

19. An apparatus for receiving a plurality of packets having a defined order via wireless communication, the apparatus comprising:

means for receiving a first set of one or more packets of the plurality of packets having the defined order via a first wireless communication link with a network;

means for receiving a second set of one or more packets of the plurality of packets having the defined order via a different second wireless communication link with the network;

means for adding the first set of one or more packets of the plurality of packets having the defined order, which were received via the first wireless communication link with the network, to a packet buffer;

means for adding the second set of one or more packets of the plurality of packets having the defined order, which were received via the different second wireless communication link with the network, to the packet buffer;

means for detecting, based at least in part on the defined order, that the first set of one or more packets, which were received via the first wireless communication link with the network and were added to the packet buffer, and the second set of one or more packets, which were received via the different second wireless communication link with the network and were added to the packet buffer, satisfy a threshold occupancy of the packet buffer; and means for simulating a degradation of at least one of the first wireless communication link or the different second wireless communication link based on detecting that the first set of one or more packets, which were received via the first wireless communication link with the network and were added to the packet buffer, and the second set of one or more packets, which were received via the different second wireless communication link with the network and were added to the packet buffer, satisfy the threshold occupancy of the packet buffer.

* * * * *